United States Patent
Galpin et al.

(10) Patent No.: US 11,973,964 B2
(45) Date of Patent: Apr. 30, 2024

(54) VIDEO COMPRESSION BASED ON LONG RANGE END-TO-END DEEP LEARNING

(71) Applicant: INTERDIGITAL MADISON PATENT HOLDINGS, SAS, Paris (FR)

(72) Inventors: Franck Galpin, Thorigne-Fouillard (FR); Hien Pham, Paris (FR); Jean Begaint, Menlo Park, CA (US)

(73) Assignee: INTERDIGITAL MADISON PATENT HOLDINGS, SAS, Paris (FR)

( * ) Notice: Subject to any disclaimer, the term of this patent is extended or adjusted under 35 U.S.C. 154(b) by 0 days.

(21) Appl. No.: 17/761,487

(22) PCT Filed: Sep. 15, 2020

(86) PCT No.: PCT/US2020/050892
§ 371 (c)(1),
(2) Date: Mar. 17, 2022

(87) PCT Pub. No.: WO2021/055360
PCT Pub. Date: Mar. 25, 2021

(65) Prior Publication Data
US 2022/0377358 A1  Nov. 24, 2022

(30) Foreign Application Priority Data
Sep. 20, 2019 (EP) .................................. 19306147

(51) Int. Cl.
*H04N 19/436* (2014.01)
*H04N 19/105* (2014.01)
(Continued)

(52) U.S. Cl.
CPC ......... *H04N 19/436* (2014.11); *H04N 19/105* (2014.11); *H04N 19/137* (2014.11);
(Continued)

(58) Field of Classification Search
CPC .. H04N 19/103; H04N 19/105; H04N 19/119; H04N 19/137; H04N 19/167;
(Continued)

(56) References Cited

U.S. PATENT DOCUMENTS 10,701,394 B1 * 6/2020 Caballero .............. G06N 3/045
2004/0008782 A1    1/2004 Boyce et al.
(Continued)

OTHER PUBLICATIONS

Z. Zhao, S. Wang, S. Wang, X. Zhang, S. Ma and J. Yang, "CNN-Based Bi-Directional Motion Compensation for High Efficiency Video Coding," 2018 IEEE International Symposium on Circuits and Systems (ISCAS), Florence, Italy, 2018, pp. 1-4, doi: 10.1109/ISCAS.2018.8351189.*
(Continued)

*Primary Examiner* — Mohammed S Rahaman
(74) *Attorney, Agent, or Firm* — CONDO ROCCIA KOPTIW LLP

(57) ABSTRACT

At least a method and an apparatus are presented for efficiently encoding or decoding video. For example, a plurality of frames is provided to a motion estimator to produce an output comprising estimated motion information. The estimated motion information is provided to an auto-encoder or an auto-decoder to produce an output comprising reconstructed motion field. The reconstructed motion field and one or more decoded frames of the plurality of frames are provided to a deep neural network to produce an output comprising refined bi-directional motion field. The video is encoded or decoded based on the refined bi-directional motion field.

28 Claims, 17 Drawing Sheets

(51) Int. Cl.
| | |
|---|---|
| H04N 19/137 | (2014.01) |
| H04N 19/167 | (2014.01) |
| H04N 19/172 | (2014.01) |
| H04N 19/177 | (2014.01) |
| H04N 19/543 | (2014.01) |
| H04N 19/573 | (2014.01) |
| H04N 19/85 | (2014.01) |

(52) U.S. Cl.
CPC ......... *H04N 19/167* (2014.11); *H04N 19/172* (2014.11); *H04N 19/177* (2014.11); *H04N 19/543* (2014.11); *H04N 19/573* (2014.11); *H04N 19/85* (2014.11)

(58) Field of Classification Search
CPC .... H04N 19/17; H04N 19/172; H04N 19/176; H04N 19/177; H04N 19/192; H04N 19/436; H04N 19/52; H04N 19/543; H04N 19/573; H04N 19/577; H04N 19/61; H04N 19/85; H04N 19/96
See application file for complete search history.

(56) References Cited

U.S. PATENT DOCUMENTS

| | | | | |
|---|---|---|---|---|
| 2015/0195524 | A1* | 7/2015 | Li | H04N 19/46 375/240.02 |
| 2019/0332939 | A1* | 10/2019 | Alletto | G06N 3/08 |
| 2021/0021823 | A1* | 1/2021 | Na | H04N 19/176 |
| 2021/0044804 | A1* | 2/2021 | Lu | H04N 19/132 |

OTHER PUBLICATIONS

Meister, S., Hur, J., & Roth, S. (2018). UnFlow: Unsupervised Learning of Optical Flow With a Bidirectional Census Loss. Proceedings of the AAAI Conference on Artificial Intelligence, 32(1). https://doi.org/10.1609/aaai.v32i1.12276.*

Y. Wang, Y. Yang, Z. Yang, L. Zhao, P. Wang, W. Xu, Occlusion aware unsupervised learning of optical flow, in: Proc. CVPR, 2018, pp. 4884-4893.*

Anonymous, "Series H: Audiovisual and Multimedia Systems—Infrastructure of audiovisual services—Coding of moving video: Reference software for ITU-T H.265 high efficiency video coding", International Telecommunication Union, Recommendation ITU-T H.265.2, Oct. 2014, 12 pages.

Yoo et al., "Direction-Select Motion Estimation for Motion-Compensated Frame Rate Up-Conversion", Institute of Electronic and Electrical Engineers (IEEE), Journal of Display Technology, vol. 9, Issue 10, Oct. 2013, 11 pages.

Rippel et al., "Learned Video Compression", arxiv.org, Cornell University Library: Image and Video Processing (eess.IV), Document: ArXiv:1811.06981, Nov. 16, 2018, 11 pages.

Thang et al., "An Efficient Non-Selective Adaptive Motion Compensated Frame Rate Up Conversion", Institute of Electronic and Electrical Engineers (IEEE), 2017 IEEE International Symposium on Circuits and Systems (ISCAS), Baltimore, Maryland, USA, May 28, 2017, 4 pages.

Zhao et al., "CNN-Based Bi-Directional Motion Compensation for High Efficiency Video Coding", Institute of Electronic and Electrical Engineers (IEEE), 2018 IEEE International Symposium on Circuits and Systems (ISCAS), Florence, Italy, May 27, 2018, 4 pages.

Jaderberg et al., "Spatial Transformer Networks", arxiv.org, Cornell University Library: Computer Vision and Pattern Recognition, Document: arXiv:1506.02025v3, Feb. 4, 2016, 15 pages.

Balle et al., "End-to-end Optimized Image Compression", arxiv.org, Cornell University Library: Computer Vision and Pattern Recognition, Document: arXiv:1611.01704, Mar. 3, 2017, 27 pages.

Bross et al., "Versatile Video Coding (Draft 5)", Joint Video Experts Team (JVET) of ITU-T Sg 16 WP 3 and ISO/IEC JTC 1/SC 29/WG 11, Document: JVET-N1001-v2, 14th Meeting, Geneva, Switzerland, Mar. 19, 2019, 361 pages.

Anonymous, "Versatile Video Coding", International Telecommunication Union, ITU-T Telecommunication Standardization Sector of ITU, Series H: Audiovisual and Multimedia Systems, Infrastructure of audiovisual services—Coding of moving video, Recommendation ITU-T H.266, Aug. 2020, 516 pages.

* cited by examiner

- DNN motion estimator
- $X$    Original data X
- $\check{X}$    refined data X
- $I_i$    Original image at time i
- $mv_{0\to 1}$    Original motion field from 0 to 1
- MC    Differentiable motion compensation

VIDEO COMPRESSION BASED ON LONG RANGE END-TO-END DEEP LEARNING

CROSS REFERENCE TO RELATED APPLICATIONS

This application is a U.S. National Stage Application under 35 U.S.C. 371 of International Patent Application No. PCT/US2020/050892, filed Sep. 15, 2020, which is incorporated herein by reference in its entirety.

This application claims the benefit of European Application No. 19306147.0, filed Sep. 20, 2019, which is incorporated herein by reference in its entirety.

TECHNICAL FIELD

At least one of the present embodiments generally relates to a method or an apparatus for video encoding or decoding, and more particularly, to a method or an apparatus for efficiently providing video compression and/or decompression based on long range end-to-end deep learning or deep neural network.

BACKGROUND

To achieve high compression efficiency, image and video coding schemes usually employ prediction, including motion vector prediction, and transform to leverage spatial and temporal redundancy in the video content. Generally, intra or inter prediction is used to exploit the intra or inter frame correlation, then the differences between the original image and the predicted image, often denoted as prediction errors or prediction residuals, are transformed, quantized, and entropy coded. To reconstruct the video, the compressed data are decoded by inverse processes corresponding to the entropy coding, quantization, transform, and prediction.

Recent additions to video compression technology include various industry standards, versions of the reference software and/or documentations such as Joint Exploration Model (JEM) and later VTM (Versatile Video Coding (VVC) Test Model) being developed by the JVET (Joint Video Exploration Team) group. The aim is to make further improvements to the existing HEVC (High Efficiency Video Coding) standard.

SUMMARY

The drawbacks and disadvantages of the prior art are solved and addressed by the general aspects described herein.

According to a first aspect, there is provided a method. The method comprises video encoding by: providing a region to encode and one or more reconstructed regions to a motion estimator to produce an output comprising estimated bi-directional motion field for the region to encode; providing the estimated bi-directional motion field to an auto-encoder to produce an output comprising a bitstream representative of the encoded region and reconstructed bi-directional motion field; providing the reconstructed bi-directional motion field and one or more reconstructed regions to a deep neural network to produce an output comprising refined bi-directional motion field for the region to encode; providing the refined bi-directional motion field and one or more reconstructed regions to a motion compensator to produce an output comprising reconstructed version of the region to encode.

According to another aspect, there is provided a second method. The method comprises video decoding by: providing a bitstream representative of an encoded region to an auto-decoder to produce an output comprising reconstructed bi-directional motion field; providing the reconstructed bi-directional motion field and one or more reconstructed regions to a deep neural network to produce an output comprising refined reconstructed bi-directional motion field; and providing the refined bi-directional motion field and one or more reconstructed regions to a motion compensator to produce an output comprising reconstructed version of the encoded region, the output corresponding to the decoded region.

According to another aspect, there is provided an apparatus. The apparatus comprises one or more processors, wherein the one or more processors are configured to implement the method for video encoding according to any of its variants. According to another aspect, the apparatus for video encoding comprises: means for providing a region to encode and one or more reconstructed regions to a motion estimator to produce an output comprising estimated bi-directional motion field for the region to encode; means for providing the estimated bi-directional motion field to an auto-encoder to produce an output comprising a bitstream representative of the encoded region and reconstructed bi-directional motion field; means for providing the reconstructed bi-directional motion field and one or more reconstructed regions to a deep neural network to produce an output comprising refined bi-directional motion field for the region to encode; and means for providing the refined bi-directional motion field and one or more reconstructed regions to a motion compensator to produce an output comprising reconstructed version of the region to encode.

According to another aspect, there is provided another apparatus. The apparatus comprises one or more processors, wherein the one or more processors are configured to implement the method for video decoding according to any of its variants. According to another aspect, the apparatus for video decoding comprises means for providing a bitstream representative of an encoded region to an auto-decoder to produce an output comprising reconstructed bi-directional motion field; means for providing the reconstructed bi-directional motion field and one or more reconstructed regions to a deep neural network to produce an output comprising refined reconstructed bi-directional motion field; and means for providing the refined bi-directional motion field and one or more reconstructed regions to a motion compensator to produce an output comprising reconstructed version of the encoded region, the output corresponding to the decoded region.

According to another general aspect of at least one embodiment, the motion compensator performs a differentiable motion compensation based on the refined bi-directional motion field and the one or more reconstructed regions.

According to another general aspect of at least one embodiment, a bi-directional motion field comprises two uni-directional motion fields.

According to another general aspect of at least one embodiment, a motion correction is determined by the deep neural network that is applied symmetrically to the two uni-directional motion fields of the reconstructed bi-directional motion field to produce the refined bi-directional motion field.

According to another general aspect of at least one embodiment, two motion corrections are determined by the deep neural network that are respectively applied to each of the two uni-directional motion fields of the reconstructed bi-directional motion field to produce the refined bi-directional motion field.

According to another general aspect of at least one embodiment, the two refined uni-directional motion fields are based respectively on 1) a uni-directional motion field between a region of a first reference frame and the region to encode or decode of a subsequent frame, and 2) a motion uni-directional field between the region to encode or decode in the subsequent frame and a region of a next subsequent frame. Thus, the bi-prediction is di-directional prediction (from past and future).

According to another general aspect of at least one embodiment, the plurality of frames form a Group of Picture (GOP) in a video sequence.

According to another general aspect of at least one embodiment, providing the one or more reconstructed regions to a deep neural network is performed by enlarging the one or more reconstructed regions at an input of the deep neural network.

According to another general aspect of at least one embodiment, a residual error is further provided to the auto-encoder or the auto-decoder.

According to another general aspect of at least one embodiment, a training process is provided for the deep neural network using at least a pair of reconstructed regions.

According to another general aspect of at least one embodiment, a region is one of a block or a frame.

According to another general aspect of at least one embodiment, a mask for weighting motion-compensated prediction regions is further provided to the auto-encoder or the auto-decoder. Thus, the method is compatible with advanced prediction.

According to another general aspect of at least one embodiment, the mask for weighting motion-compensated prediction regions is further refined by the DNN.

According to another general aspect of at least one embodiment, there is provided a device comprising an apparatus according to any of the decoding embodiments; and at least one of (i) an antenna configured to receive a signal, the signal including the video block, (ii) a band limiter configured to limit the received signal to a band of frequencies that includes the video block, or (iii) a display configured to display an output representative of the video block.

According to another general aspect of at least one embodiment, there is provided a non-transitory computer readable medium containing data content generated according to any of the described encoding embodiments or variants.

According to another general aspect of at least one embodiment, there is provided a signal comprising video data generated according to any of the described encoding embodiments or variants.

According to another general aspect of at least one embodiment, a bitstream is formatted to include data content generated according to any of the described encoding embodiments or variants.

According to another general aspect of at least one embodiment, there is provided a computer program product comprising instructions which, when the program is executed by a computer, cause the computer to carry out any of the described encoding/decoding embodiments or variants.

These and other aspects, features and advantages of the general aspects will become apparent from the following detailed description of exemplary embodiments, which is to be read in connection with the accompanying drawings.

DETAILED DESCRIPTION

Figure 1:
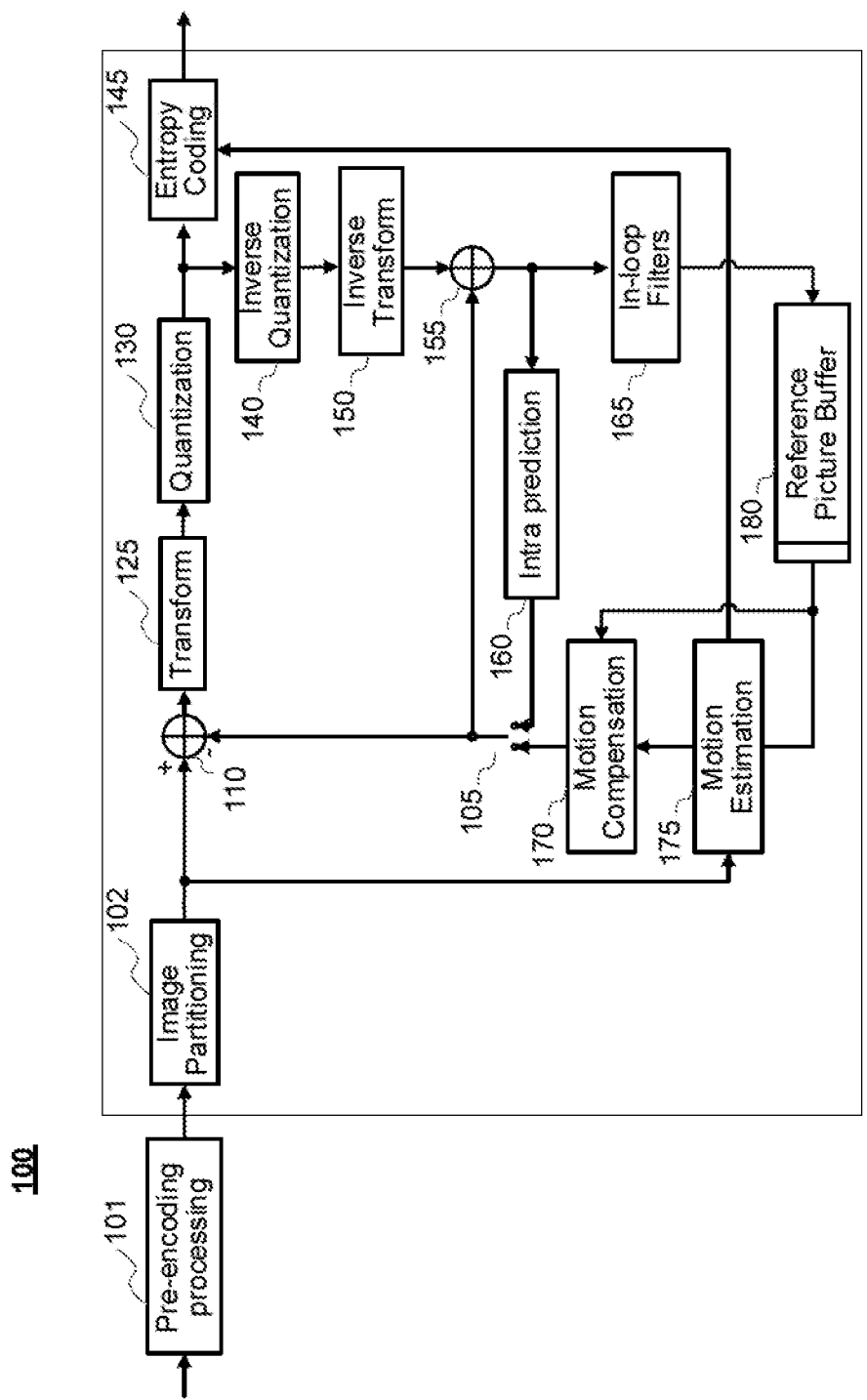
FIG. 1 illustrates a block diagram of an embodiment of a video encoder.

FIG. 1 illustrates an example video encoder 100, such as a High Efficiency Video Coding (HEVC) encoder. FIG. 1 may also illustrate an encoder in which improvements are made to the HEVC standard or an encoder employing technologies similar to HEVC, such as a VVC (Versatile Video Coding) encoder under development by JVET (Joint Video Exploration Team).

In the present application, the terms "reconstructed" and "decoded" may be used interchangeably, the terms "encoded" or "coded" may be used interchangeably, and the terms "image", "picture" and "frame" may be used interchangeably.

Before being encoded, the video sequence may go through pre-encoding processing (101), for example, applying a color transform to the input color picture (e.g., conversion from RGB 4:4:4 to YCbCr 4:2:0) or performing a remapping of the input picture components in order to get a signal distribution more resilient to compression (for instance using a histogram equalization of one of the color components). Metadata may be associated with the pre-processing, and attached to the bitstream.

In HEVC, to encode a video sequence with one or more pictures, a picture is partitioned (102) into one or more slices where each slice may include one or more slice segments. A slice segment is organized into coding units, prediction units, and transform units. The HEVC specification distinguishes between "blocks" and "units," where a "block" addresses a specific area in a sample array (e.g., luma, Y), and the "unit" includes the collocated blocks of all encoded color components (e.g., Y, Cb, Cr, or monochrome), syntax elements, and prediction data that are associated with the blocks (e.g., motion vectors).

For coding, a picture is partitioned into coding tree blocks (CTB) of square shape with a configurable size, and a consecutive set of coding tree blocks is grouped into a slice. A Coding Tree Unit (CTU) contains the CTBs of the encoded color components. A CTB is the root of a quadtree partitioning into Coding Blocks (CB), and a Coding Block may be partitioned into one or more Prediction Blocks (PB) and forms the root of a quadtree partitioning into Transform Blocks (TBs). Corresponding to the Coding Block, Prediction Block, and Transform Block, a Coding Unit (CU) includes the Prediction Units (PUs) and the tree-structured set of Transform Units (TUs), a PU includes the prediction information for all color components, and a TU includes residual coding syntax structure for each color component. The size of a CB, PB, and TB of the luma component applies to the corresponding CU, PU, and TU. In the present application, the term "block" may be used to refer, for example, to any of CTU, CU, PU, TU, CB, PB, and TB. In addition, the "block" may also be used to refer to a macroblock and a partition as specified in H.264/AVC or other video coding standards, and more generally to refer to an array of data of various sizes.

In the exemplary encoder 100, a picture is encoded by the encoder elements as described below. The picture to be encoded is processed in units of CUs. Each CU is encoded using either an intra or inter mode. When a CU is encoded in an intra mode, it performs intra prediction (160). In an inter mode, motion estimation (175) and compensation (170) are performed. The encoder decides (105) which one of the intra mode or inter mode to use for encoding the CU, and indicates the intra/inter decision by a prediction mode flag. Prediction residuals are calculated by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder may also skip the transform and apply quantization directly to the non-transformed residual signal on a 4×4 TU basis. The encoder may also bypass both transform and quantization, i.e., the residual is coded directly without the application of the transform or quantization process. In direct PCM coding, no prediction is applied and the coding unit samples are directly coded into the bitstream.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture, for example, to perform deblocking/SAO (Sample Adaptive Offset) filtering to reduce encoding artifacts. The filtered image is stored at a reference picture buffer (180).

Figure 2:
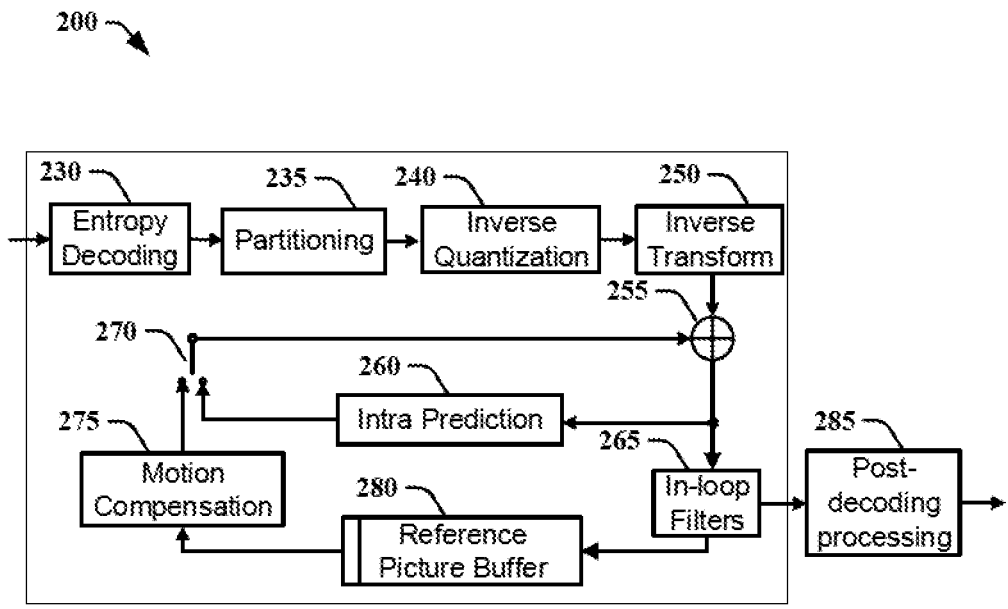
FIG. 2 illustrates a block diagram of an embodiment of a video decoder.

FIG. 2 illustrates a block diagram of an example video decoder 200, such as an HEVC decoder. In decoder 200, a bitstream is decoded by the decoder elements as described below. Video decoder 200 generally performs a decoding pass reciprocal to the encoding pass as described in FIG. 1, which performs video decoding as part of encoding video data. FIG. 2 may also illustrate a decoder in which improvements are made to the HEVC standard or a decoder employing technologies similar to HEVC, such as a VVC decoder.

In particular, the input of the decoder includes a video bitstream, which may be generated by video encoder 100. The bitstream is first entropy decoded (230) to obtain transform coefficients, motion vectors, picture partitioning information, and other coded information. The picture partitioning information indicates the size of the CTUs, and a manner a CTU is split into CUs, and possibly into PUs when applicable. The decoder may therefore divide (235) the picture into CTUs, and each CTU into CUs, according to the decoded picture partitioning information. The transform coefficients are de-quantized (240) and inverse transformed (250) to decode the prediction residuals.

Combining (255) the decoded prediction residuals and the predicted block, an image block is reconstructed. The predicted block may be obtained (270) from intra prediction (260) or motion-compensated prediction (i.e., inter prediction) (275). In case of bi-prediction, two motion compensated predictions may be combined with a weighted sum. In-loop filters (265) are applied to the reconstructed image. The filtered image is stored at a reference picture buffer (280).

The decoded picture can further go through post-decoding processing (285), for example, an inverse color transform (e.g., conversion from YCbCr 4:2:0 to RGB 4:4:4) or an inverse remapping performing the inverse of the remapping process performed in the pre-encoding processing (101). The post-decoding processing may use metadata derived in the pre-encoding processing and signaled in the bitstream.

Figure 3:
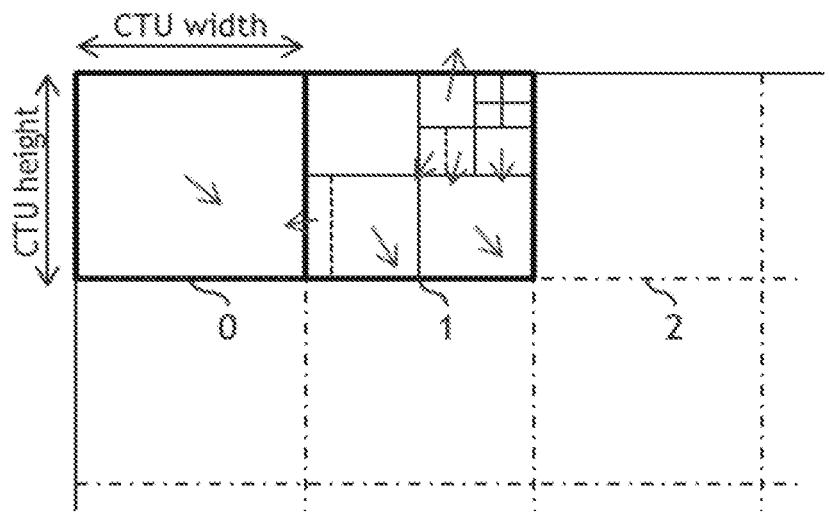
FIG. 3 shows a pictorial example illustrating Coding Tree Unit and Coding Tree concepts to represent a compressed HEVC picture.
Figure 4:
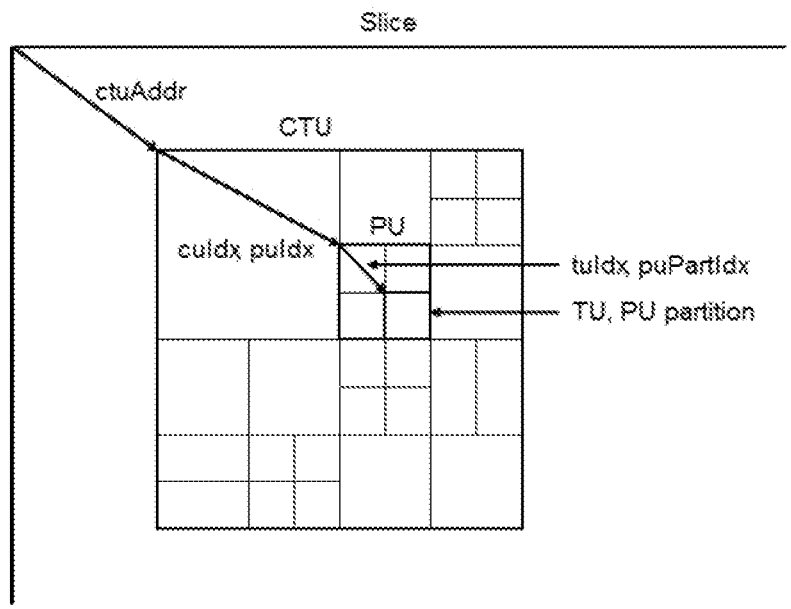
FIG. 4 shows a pictorial example illustrating a division of a Coding Tree Unit into Coding Units, Prediction Units and Transform Units.

In the HEVC video compression standard, a picture is divided into so-called Coding Tree Units (CTU), whose size is typically 64×64, 128×128, or 256×256 pixels. Each CTU is represented by a Coding Tree in the compressed domain. This is a quad-tree division of the CTU, where each leaf is called a Coding Unit (CU), as illustrated in FIG. 3. Each CU is then given some intra or inter prediction parameters (e.g., Prediction Info). To do so, it is spatially partitioned into one or more Prediction Units (PUs), each PU being assigned some prediction information. The intra or inter coding mode is assigned on the CU level, as illustrated in FIG. 4.

Present disclosure is in the field of image and video compression/decompression and Deep Neural Network (DNN) applications. It aims at improving compression efficiency compared to existing image/video compression systems.

More specifically, the domain is the encoding/decoding of video sequence, using temporal hierarchical GOP (Group of Pictures) structure, similar to conventional video codec (typically random access GOP structure, see, e.g., "*High*

Efficiency Video Coding (HEVC) Specifications", ITU-T H.265, October, 2014). A video sequence is split into several GOPs, where each image inside a GOP can be predicted using already decoded pictures (in the past and the future of the current frame to encode).

The proposed invention introduces the use of deep learning or DNN (Deep Neural Network) inside this coding scheme to improve the coding efficiency. A network is, e.g., trained end-to-end but using coder side information.

Deep Neural Networks (DNNs) have shown state of the art performance in variety of domains such as computer vision, speech recognition, natural language processing, etc. This performance, however, comes at the cost of massive computational cost as DNNs tend to have a huge number of parameters often running into millions, and sometimes even billions. This leads to prohibitively high inference complexity—the computational cost of applying trained DNN to test data for inference. This high inference complexity is the main challenge in bringing the performance of DNNs to mobile or embedded devices with resource limitations on battery size, computational power, and memory capacity, for example.

Deep learning-based compression systems employ machine learning techniques, such as a trained convolutional network, in order to automatically discover internal structures or representations of an input image or video frames of an input video. As opposed to hard-coded techniques, enabling the automatic discovery of structures enables the more efficient representation of an input image. Namely, the encoded input image encoded through deep learning techniques achieves improved reconstruction quality and improved compression ratios as compared to conventional techniques. For example, one or more models can be trained once based on machine learning techniques, but the trained models can be applied to input images regardless of input image dimensions and desired target bit rate, and the one or more trained models are progressive with increased image reconstruction quality in response to increased available bits for compression. In deep learning based compression scheme, an auto-encoder is defined as a network with two parts: the first part (called the encoder) takes an input and processes it in order to produce a representation (usually with a lower dimension or entropy compared to the input). The second part uses this latent representation and aims at recovering the original input.

The problem solved by this invention is to be able to use DNN for long range motion estimation in video coding scheme, allowing temporal hierarchical coding. In conventional video codec, long range (for example, using GOP of size with 16 or 32 frames) motion compensation is used to improve compression performances. Indeed, the longer the picture range (assuming a good prediction quality), the more the video sequence may be compressed and processed with less bit rate.

In previous and existing compression systems, DNN based motion estimation (or frame interpolation) has been applied for only short motion range. For example, in *Learned Video Compression*, Oren Rippel, Sanjay Nair, Carissa Lew, Steve Branson, Alexander G. Anderson, Lubomir Bourdev, (https://arxiv.org/pdf/1811.06981.pdf), an end-to-end DNN based compression scheme is proposed, but using only short range motion estimation (i.e., the motion between the current and previous frame). In the same article, a motion field and a residual error are jointly optimized and sent to a decoder, using previously available information (image reconstruction, motion field or even latent variables), but the proposed scheme still relies only on short range motion as its DNN based approach does not handle large motion. In addition, the same proposed system disallows the use of bi-directional frames in order to decrease latency.

In recent video codec (for example, VVC/H266), decoder side motion refinement has been introduced (see, e.g., Decoder-side Motion Vector Refinement (DMVR) or even Bi-directional Optical Flow (BDOF) process in *Versatile Video Coding* (Draft 5), JVET-N1001, 14th Meeting: Geneva. CH, 19-27 Mar. 2019). The technology allows for automatic refinement at decoder side of a bi-directional motion field sent by the encoder. However, the encoding of the motion field and the refinement are done separately in this case.

Another potential issue with end-to-end approaches is that the result entirely relies on the input (input images) and control of the output (the motion field, for example) is difficult.

Accordingly, present embodiments solve the above described problems and deficiencies of the existing compression systems by:
  incorporating signaled motion field (coder side information) in the process by taking into account decoder side refinement in the coder side motion field coding;
  training a motion field encoding network based on frame interpolation and known motion;
  training a full inter-prediction with decoder side motion refinement, and auto-encoded motion field; and/or
  adding a residual coding in the scheme to allow full end-to-end optimization.

Figure 5:
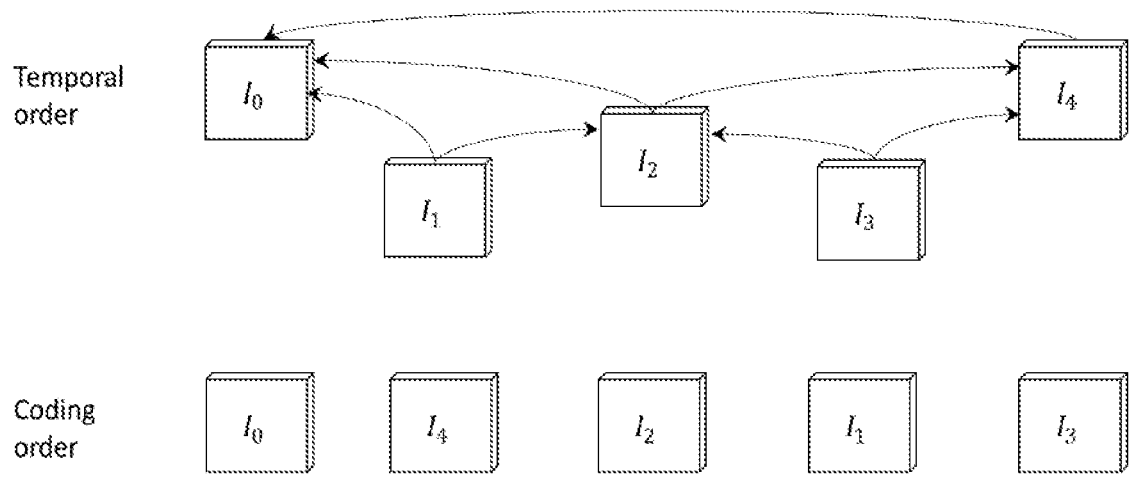
FIG. 5 shows an example of hierarchical encoding using a Group of Picture (GOP).

In the following, we assume the encoding of a video sequence using a temporal hierarchical approach, similar to the random-access structure in HEVC. As a general example, FIG. 5 illustrates a GOP (Group of Pictures) of 5 frames being encoded. First, the frame 0 ($I_0$) is encoded, then the frame 4 ($I_4$), using data from frame 0($I_0$), then frame 2 ($I_2$) is encoded using data from the past (frame 0), and the future (frame 4) and so on.

In the following example, we assume a GOP of size 3 comprising frame 0 ($I_0$), frame 1 ($I_1$) and frame 2 ($I_2$), but the principle applies to a GOP of any size. In this example, the frame 0 ($I_0$) is encoded, then the frame 2 ($I_2$), using data from frame 0 ($I_0$), then the subsequent frame 1 ($I_1$) is encoded using data from the past (frame 0), and the future (next subsequent frame 2). The skilled in the art will easily extend this example to the GOP of FIG. 5 or to a GOP of any size wherein the encoding of a frame, frame 3, using previously decoded frames 0 and 4 would also follow the same process and/or architecture.

In the following, the notation used are as follows:
  X: original data
  $\hat{X}$: reconstructed data (after full decoding process), usually a prediction+a residual error
  $\tilde{X}$: predicted data (using already decoded data)
  $\check{X}$: refined data (using already decoded data)
  $I_k$: image at time k
  $mv_{i \to j}$: motion field from time i to time j (applying a motion compensation using $mv_{i \to j}$ and $I_i$ gives a prediction of $I_j$)

One main idea of the present disclosure is to use an encoded/decoded coder-side computed motion field jointly with a decoder side DNN (Deep Neural Network) to predict a frame from 2 or more frames. The whole process is expressed as a DNN:
  An auto-encoder with a bottleneck entropy (aims at compressing the input) to encode the motion field (see, e.g., *End-to-end Optimized Image Compression*, Johannes Ballé, Valero Laparra, Eero P. Simoncelli, https://arxiv.org/abs/1611.01704 for an example of auto-encoder used for compression purpose).

A DNN for the motion field refinement.

A differentiable motion compensation (see, e.g., *Spatial Transformer Networks*, Max Jaderberg, Karen Simonyan, Andrew Zisserman, Koray Kavukcuoglu, https://arxiv.org/abs/1506.02025).

The whole chain may be trained unsupervised (giving triplet of successive images) and jointly. The main advantage is that the motion field encoding takes into account the further decoder side refinement (as described below in the training section) and that the motion field refinement is not limited by large motion in the images.

We first present a simple framework and then present additional improvements over this framework herein.

Associated Encoding Process/Encoder

Figure 6:
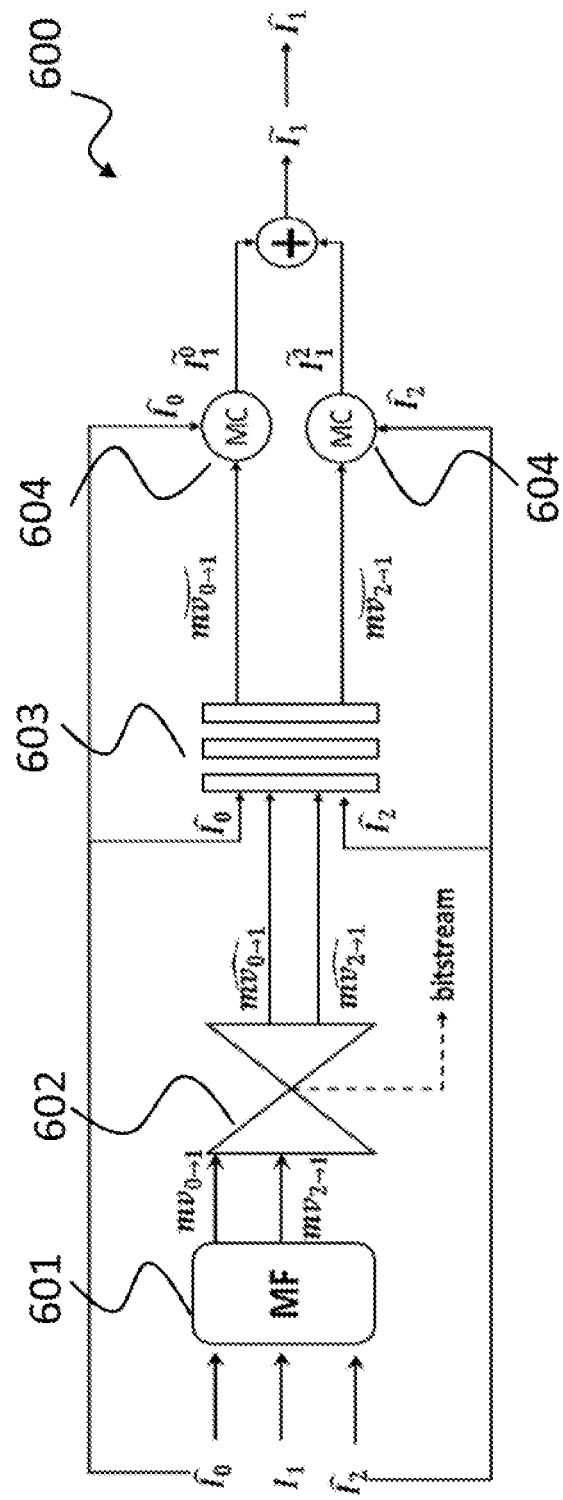
FIG. 6 shows an example of an encoder or an encoding process according to an embodiment.

FIG. 6 shows an overall process/block diagram for encoding 600 a frame $I_1$ according to an embodiment. First, in step 601, 2 reconstructed frames (hence available at decoder side) $\hat{I}_0$ and $\hat{I}_2$, and the original frame $I_1$ to be encoded are input to a coder side motion estimator MF. According to a variant, the estimator MF is a bi-directional block-matching estimator. The output of the estimator MF is a motion information representative of the motion between the reconstructed frame $\hat{I}_0$ and the original frame $I_1$ and the motion between the reconstructed frame $\hat{I}_2$ and the original frame $I_1$. Thus, the output of the estimator MF is called estimated bi-directional motion field. Typically, in the GOP example, the reconstructed frame $\hat{I}_0$ is a preceding frame of the original frame $I_1$ and the reconstructed frame $\hat{I}_2$ is a subsequent frame to the original frame $I_1$, thus the motion information is a bi-directional motion information (motion from the past and from the future). According to an embodiment, a bi-directional motion field comprises two uni-directional motion fields in $mv_{0 \to 1}$ and $mv_{2 \to 1}$. However, the present principles are not limited to literal bi-directional prediction but are also compatible more generally with bi-prediction. For instance, according to another example, typically used for low delay compression, both reconstructed frame $\hat{I}_0$ and reconstructed frame $\hat{I}_2$ are preceding frames of the original frame $I_1$. The output of the estimator ME is a motion information representative of block-based motion (including adaptive block size), thus being referred at the frame level to motion field. However, the present principles are compatible more generally with any motion representation such as block-based motion represented by a motion vector at the block level, sub-block motion information represented by a motion field at block level, up-to-pixel wise motion information.

The bi-directional motion field ($mv_{0 \to 1}$, $mv_{2 \to 1}$) is output by the estimator, and this motion field is then auto-encoded in a step 602, using an auto-encoder, for example, like the one described in *End-to-end Optimized Image Compression* already referenced above. A bitstream is generated to transmit this motion field to the decoder. The decoder part of the auto-encoder generates a reconstructed motion field ($\widehat{mv_{0 \to 1}}$, $\widehat{mv_{2 \to 1}}$). In a step 603, the reconstructed motion field ($\widehat{mv_{0 \to 1}}$, $\widehat{mv_{2 \to 1}}$) is then used, together with already reconstructed frames $\hat{I}_0$ and $\hat{I}_2$ to produce the refined bi-directional motion field noted ($\widetilde{mv_{0 \to 1}}$, $\widetilde{mv_{2 \to 1}}$) using a DNN (see below for additional details).

Using the reconstructed and refined motion field and the already reconstructed frames, a motion compensation is performed in a step 604 to produce a prediction of the current frame $\tilde{I}_1$. In this simple example, no additional residuals are added, so that the prediction becomes the reconstruction $\hat{I}_1$ (see below for an exemplary process including the residual error). In an embodiment more particularly relevant for the training phase, a differentiable motion compensation is used, for example, similar to ones described in *Spatial Transformer Networks* already referenced above. By differentiable motion compensation, the skilled in the art would understand a motion compensation function whose derivative function exists. For simplicity, we assume here that the prediction is the average of the 2 predictions (see below for alternative embodiments). The reconstructed frame $\hat{I}_1$ is then available for being used, as reconstructed frames $\hat{I}_0$ and $\hat{I}_2$, for encoding the subsequent frames of the GOP. As previously explained, the joint training of DNN motion refinement and auto-encoder allows to perform long range motion estimation in the frames. Besides, the DNN based bi-directional motion field refinement is implemented in the decoder-side of the compression scheme and is advantageously implemented in a same way in encoding process/encoder or the corresponding decoding process/decoder (described below).

In a variant, we assume that the image to be encoded is fed region by a region (typically a block) to the whole DNN. For example, each block is sent independently to the same network. In another variant, the whole image comprising multiple blocks is fed to the DNN. According to variant embodiments, a region is one of a block or a frame.

EXAMPLES OF BI-DIRECTIONAL MOTION REFINEMENT

Figure 7:
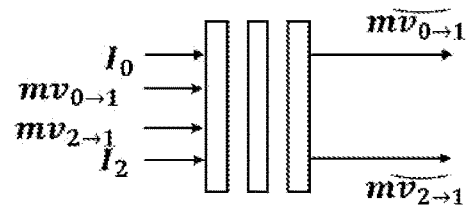
FIG. 7 shows the notations used for a decoder-side DNN for motion field refinement according to an embodiment

We also present possible decoder-side DNN based bi-directional motion field refinement variants. FIG. 7 shows the notations and input/output of this process: input are 2 images, 2 uni-directional motion fields from the first image to the middle one, and the last image to the middle one. Output are the refined uni-directional motion fields.

EXAMPLE 1

Figure 8:
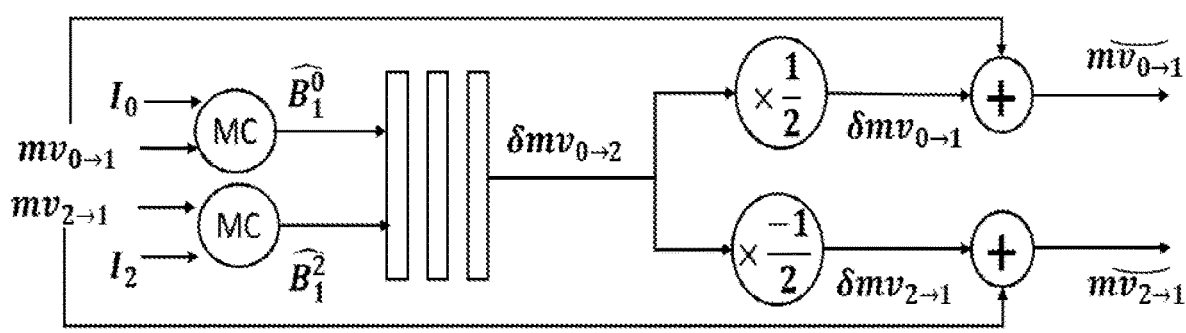
FIG. 8 shows an example of bi-directional motion field refinement according to an embodiment.

In this variant as shown in FIG. 8, we assume for simplicity that the DNN is applied block by block. Using each input block and the associated motion field (in case of block-based approach, the motion field is simply a single motion vector), each input block is motion compensated.

In order to take into account input motion vector inaccuracy, the input block is enlarged by N pixels. For example, if the input block is a 64×64 block, the block is enlarged to 96×96 (16 pixels border) to create the motion compensated block (see exemplary training processes below for details on the input and output block size).

Figure 9:
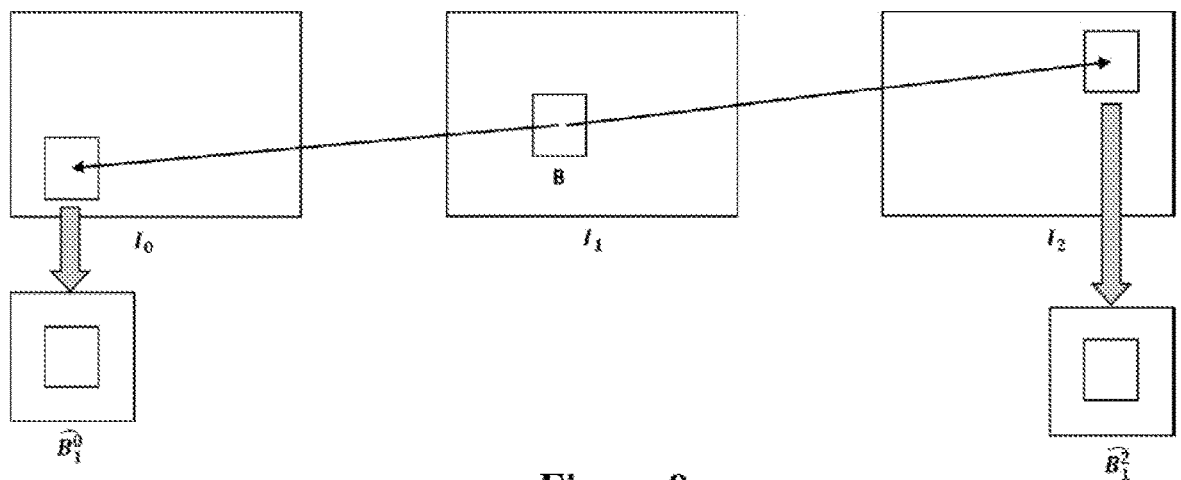
FIG. 9 shows an example of enlarging motion compensated input blocks according to an embodiment.

In FIG. 9 we show a current block B being processed. The motion vectors associated with each input block are used to motion compensate the blocks, while the block size is enlarged: $\tilde{B}_i^0$ (resp. $\tilde{B}_i^2$) is the block B enlarged and motion compensated using $mv_{0 \to 1}$ and image $I_0$. These 2 blocks are then fed to the above DNN.

The DNN output is a motion correction $\delta mv_{0 \to 2}$ (over the already motion compensated blocks), applied in a symmetric way on each uni-directional motion field. According to an embodiment, the motion correction $\delta mv_{0 \to 2}$ is an offset that is scaled by ½ and −½, the resulting motion correction $\delta mv_{0\to 1}$ and $\delta mv_{2\to 1}$ is respectively added to input motion field $mv_{0\to 1}$ and $mv_{2\to 1}$ (indeed the reconstructed motion field ($\widehat{mv_{0\to 1}}$, $\widehat{mv_{2\to 1}}$)) to produce the refined bi-directional motion field ($\widetilde{mv_{0\to 1}}$, $\widetilde{mv_{2\to 1}}$). Note that, while the input motion field is a single vector (i.e. a uniform motion field for each pixel of the block), the output is a pixel-based motion field.

According to an embodiment, the input motion field has pixel accuracy in order to avoid image interpolation of the input motion compensated blocks during the motion compensation process.

EXAMPLE 2

Figure 10:
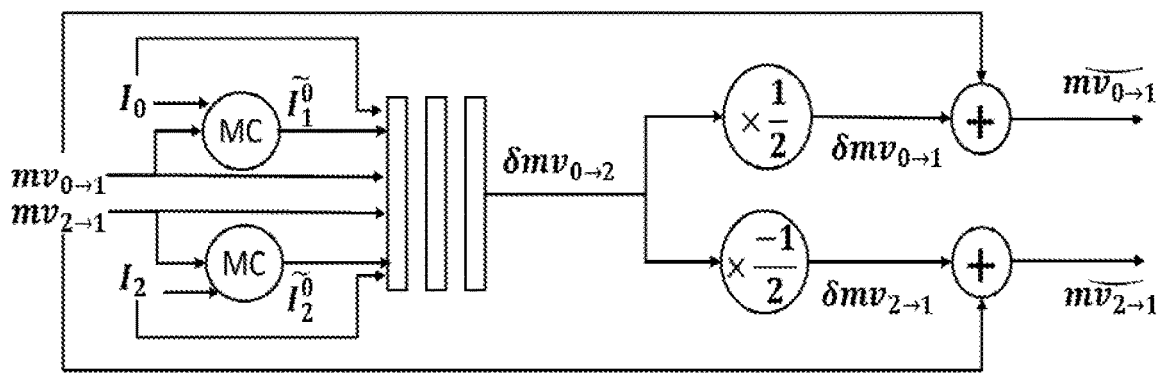
FIG. 10 shows another example of bi-directional motion field refinement according to an embodiment.

FIG. 10 illustrates another variant. In this variant, the DNN also get the coder side motion field $mv_{0\to 1}$ and $mv_{2\to 1}$ as an input, allowing to handle sub-block motion fields as input. Using each input blocks and associated motion field (in case of block-based approach, the motion field is simply a single motion vector), each input block is motion compensated.

EXAMPLE 3

Figure 11:
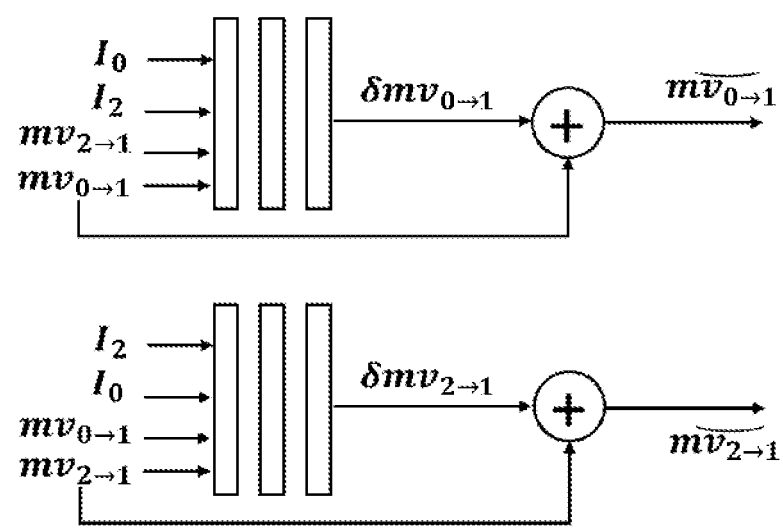
FIG. 11 shows another example of bi-directional motion field refinement according to an embodiment.

FIG. 11 illustrates another variant. In this variant, the bi-directional motion field is obtained by computing each uni-directional motion field separately: for each input images $I_0$, $I_2$ and associated motion field $mv_{0\to 1}$, $mv_{2\to 1}$, two motion corrections $\delta mv_{0\to 1}$ and $\delta mv_{2\to 1}$ are computed separately. The network is the same in both cases, with only the order of the inputs being different (see below for an exemplary training stage). Then the resulting motion correction $\delta mv_{0\to 1}$ and $\delta mv_{2\to 1}$ is respectively added to input uni-directional motion fields $mv_{0\to 1}$ and $mv_{2\to 1}$ (indeed the reconstructed uni-directional motion fields $\widehat{mv_{0\to 1}}$, $\widehat{mv_{2\to 1}}$) to produce the refined bi-directional motion field ($\widetilde{mv_{0\to 1}}$, $\widetilde{mv_{2\to 1}}$). According to this variant, one motion correction is obtained per uni-directional motion.

Associated Decoding Process/Decoder

Figure 12:
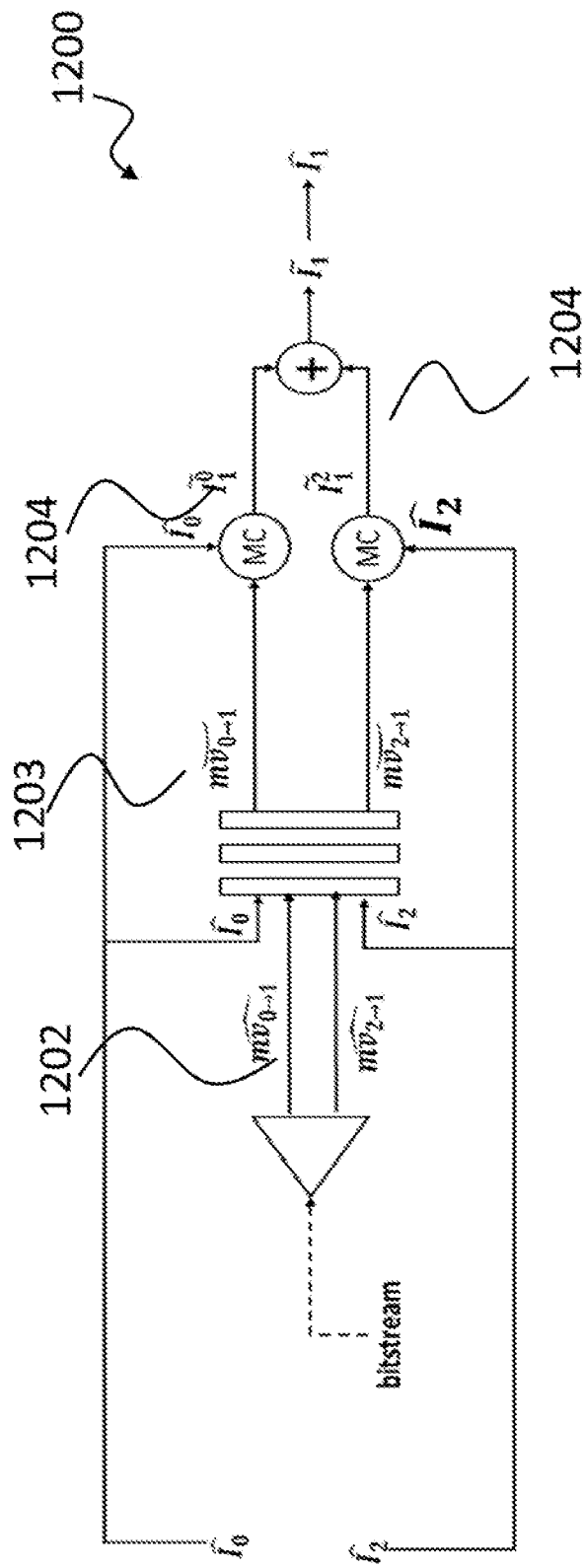
FIG. 12 shows an example of a decoder or a decoding process according to an embodiment.

In FIG. 12, we show an exemplary decoding process/decoder 1200 associated with a previous described process. The decoding process/decoder implements the steps/modules of decoder-side of the encoding process/encoder according to any of its variants. A bitstream is sent to an auto-decoder 1202 which is the decoder part of the auto-encoder 602 of FIG. 6, the auto-decoder produces the reconstructed bi-directional motion field ($\widehat{mv_{0\to 1}}$, $\widehat{mv_{2\to 1}}$). As previously explained, the terms bi-directional and pi-predicted may be used interchangeably, and the terms motion field, motion vector and motion information may be used interchangeably. In a step 1203, the reconstructed motion field is then used, together with already decoded (or reconstructed) frames $\hat{I}_0$ and $\hat{I}_2$ to produce the refined bi-directional motion field noted ($\widetilde{mv_{0\to 1}}$, $\widetilde{mv_{2\to 1}}$) using a DNN 1203 (see above for the description of the decoder-side DNN 1203 or 603 according to different variants). Using the reconstructed and refined motion field and the already decoded frames, a motion compensation 1204 is performed to produce a prediction of the current frame $\tilde{I}_1$. In a variant, the motion compensation 1204 is a differentiable motion compensation. In a variant wherein no residual information is signaled from the encoder to the decoder, the predicted frame $\tilde{I}_1$ is the reconstructed frame $\hat{I}_1$. Variant embodiments of the decoding process/decoder are described hereafter.

Associated Training Process—Overall Network

Figure 13:
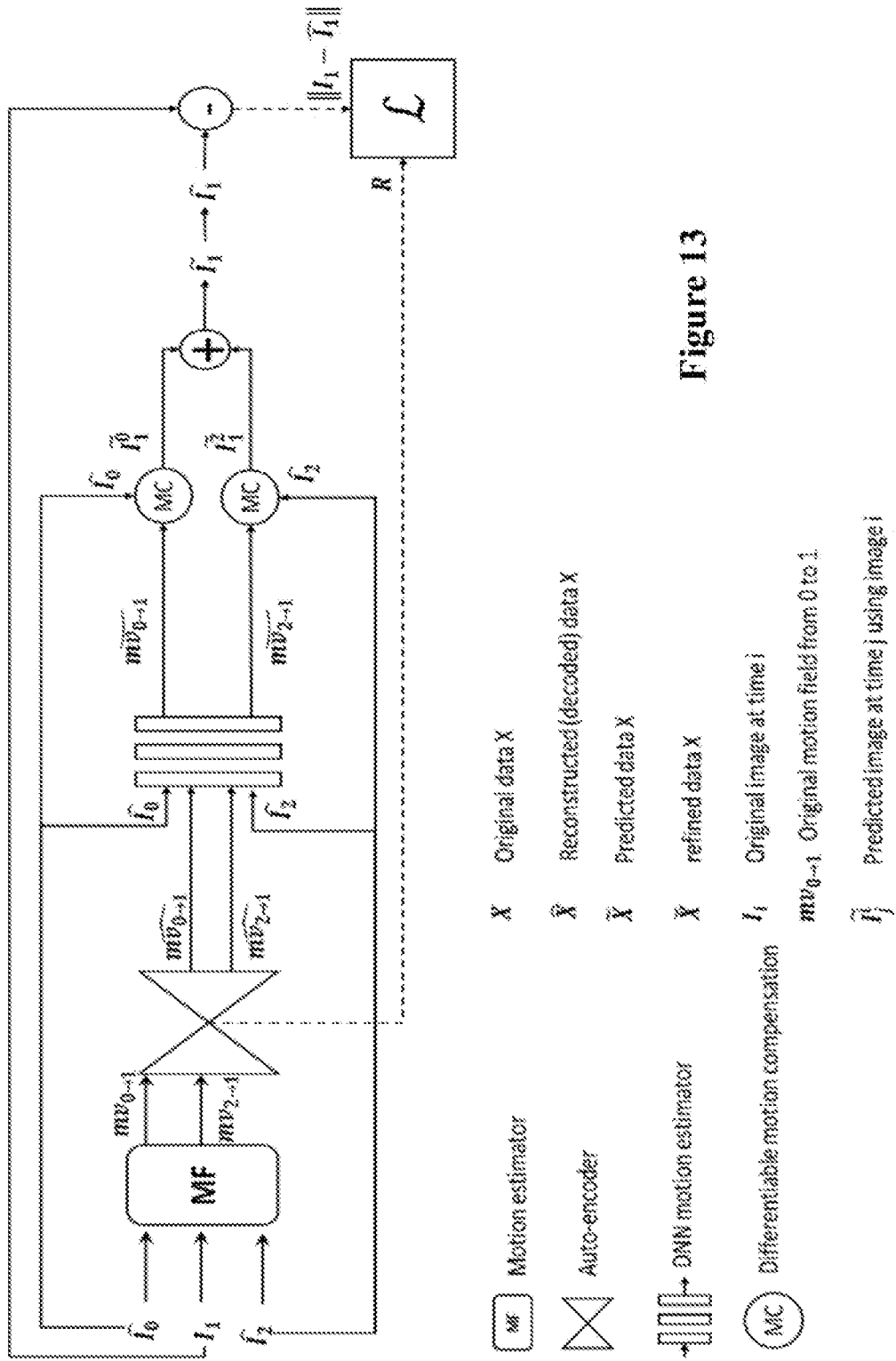
FIG. 13 shows an example of an overall training process according to an embodiment.

An example of a training process of the whole DNN is illustrated in FIG. 13 and described below. For a pair of reconstructed images (alternatively, original images can be used during training), and a given initial motion field, a loss $\mathcal{L}=\|I_1-\tilde{I}_1\|_1+\lambda R$ is minimized, where $I_1$ is the original frame to be encoded. The L1 norm $\|.\|_1$ is preferred over the L2 norm as the residual cost needs to be minimized (see below). The R parameter is given by an approximation of the rate of the motion field auto-encoder, as described in *End-to-end Optimized image Compression* already referenced above. The λ parameter is fixed for a given rate-distortion trade-off. Note that other parameters (like the quantization step in the auto-encoder) need also to be chosen during the training. According to a variant embodiment, each part of the network (auto-encoder and motion field refinement) are trained separately. The motion field auto-encoder is trained using a loss directly on the output motion field error and the coding cost of the motion field; the motion field refinement is trained using a given motion input and pair of images, minimizing the reconstruction loss of the current frame and both networks are then fine-tuned together.

According to other embodiments, optional regularization terms can be added to the process (weights norms etc.).

As mentioned above, this process is performed by block, where a block has a uniform initial motion field. Alternatively, non-uniform initial motion field can be used depending on the motion field refinement DNN type. The output of the network is a pixel-based bi-directional prediction $\tilde{I}_1$.

Motion Refinement Training Process

Figure 14:
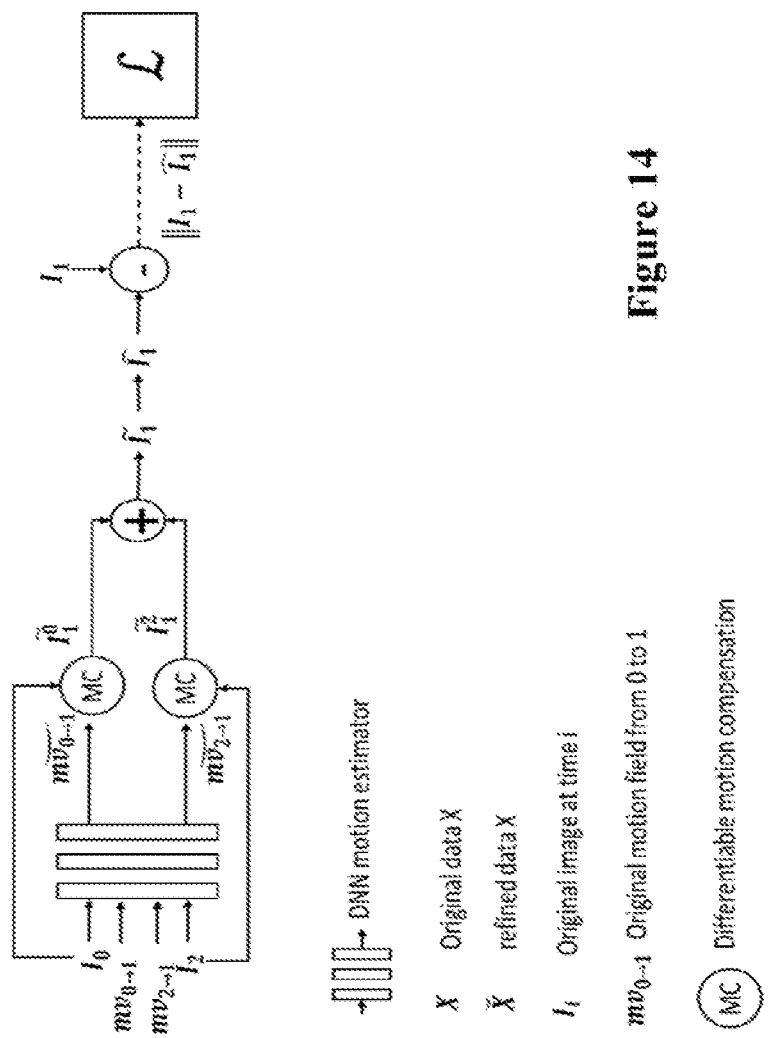
FIG. 14 shows an example of a motion refinement raining process according to an embodiment.

FIG. 14 illustrates an exemplary overall training process for all variants described above of the motion refinement network. According to an embodiment, for each pair of input images and associated initial motion field, the output bi-directional motion field ($\widetilde{mv_{0\to 1}}$, $\widetilde{mv_{2\to 1}}$) is used to create a bi-directional prediction $\tilde{I}_1$ which is used together with the original image $I_1$ in the final loss. According to another embodiment, the network is trained supervised by directly using ground truth motion bi-directional field. According to other embodiments, optional regularization terms can be used during the training.

Advanced Bi-Direction Prediction

In the following examples, the main process is the same as described above, with only differences being described.

Associated Encoding Process/Encoder

Figure 15:
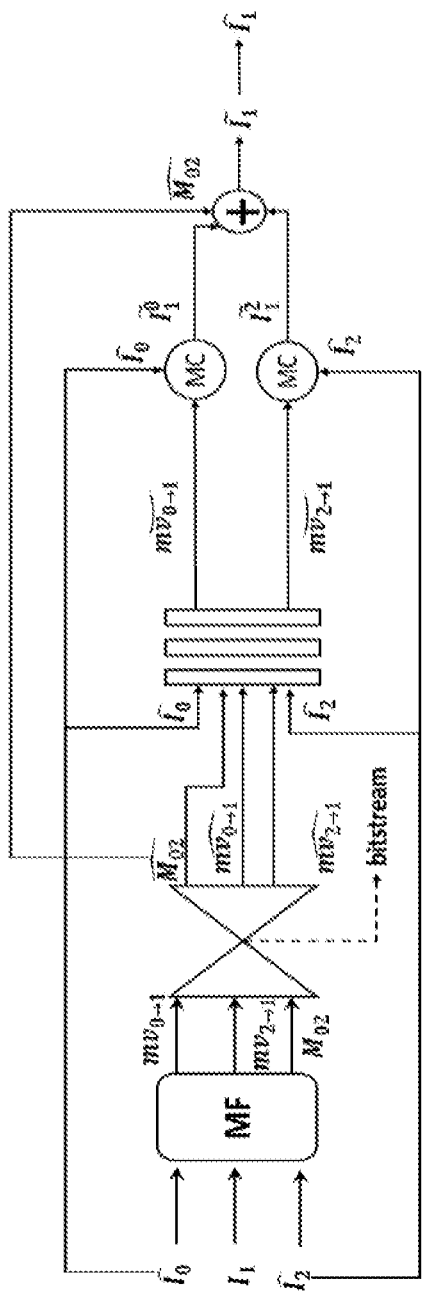
FIG. 15 shows an example of an encoder or an encoding process with advanced prediction according to an embodiment.

FIG. 15 illustrates an exemplary encoding process/encoder for bi-direction prediction. In FIG. 15, we show a more advanced process where the motion field is composed not only of the 2 uni-directional motion field $mv_{0\to 1}$, $mv_{2\to 1}$ but also of a mask (denoted by $M_{02}$ here) which indicates the relative weights of the prediction from $I_0$ and from $I_2$:

$$\tilde{I}_1(i,j)=M_{02}(i,j)*\tilde{I}_1^0+(1-M_{02}(i,j))*\tilde{I}_1^2$$

The value of the mask being binary (0 or 1), or continuous (between 0 and 1 or in other range such as [−0.25 to 1.25]). In the current example, the mask is computed by the motion estimator MF before refinement (coder side computation)

and sent to the decoder using the auto-encoder. Thus, the mask for weighting motion-compensated predictions is further provided to the auto-encoder.

In a variant, the mask values are coded by block (i.e. are uniform on each block). In another variant the values are pixel-based.

The mask is then used during the refinement process (decoder side computation of any of the, encoding or decoding process).

Associated Decoding Process/Decoder

Figure 16:
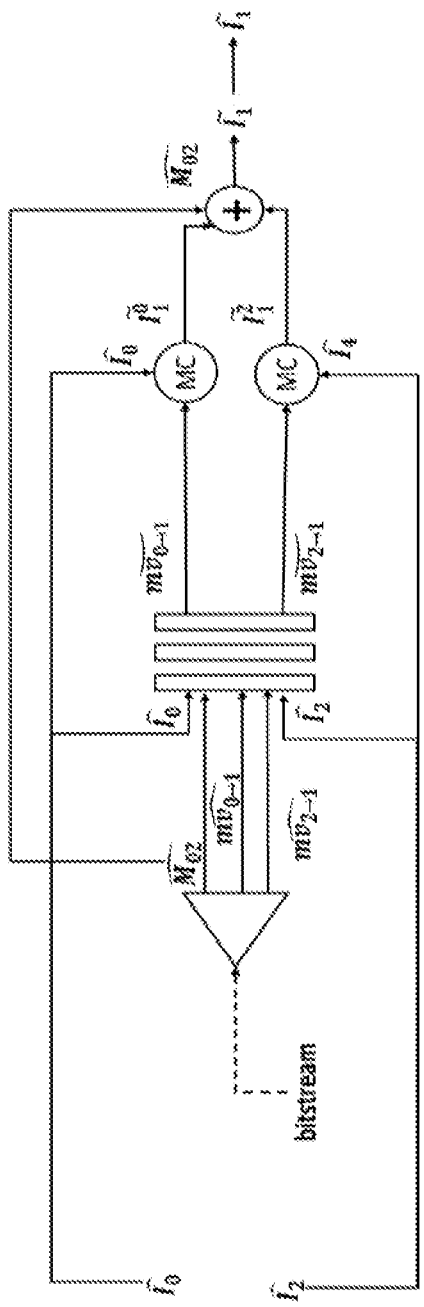
FIG. 16 shows an example of a decoder or a decoding process with advanced prediction according to an embodiment.

FIG. 16 illustrates an exemplary decoding process/decoder for bi-prediction. The decoding or decoder is similar to the one presented before, except that the decoded mask is used to form the bi-directional prediction, as shown in FIG. 16.

Additional Example

Figure 17:
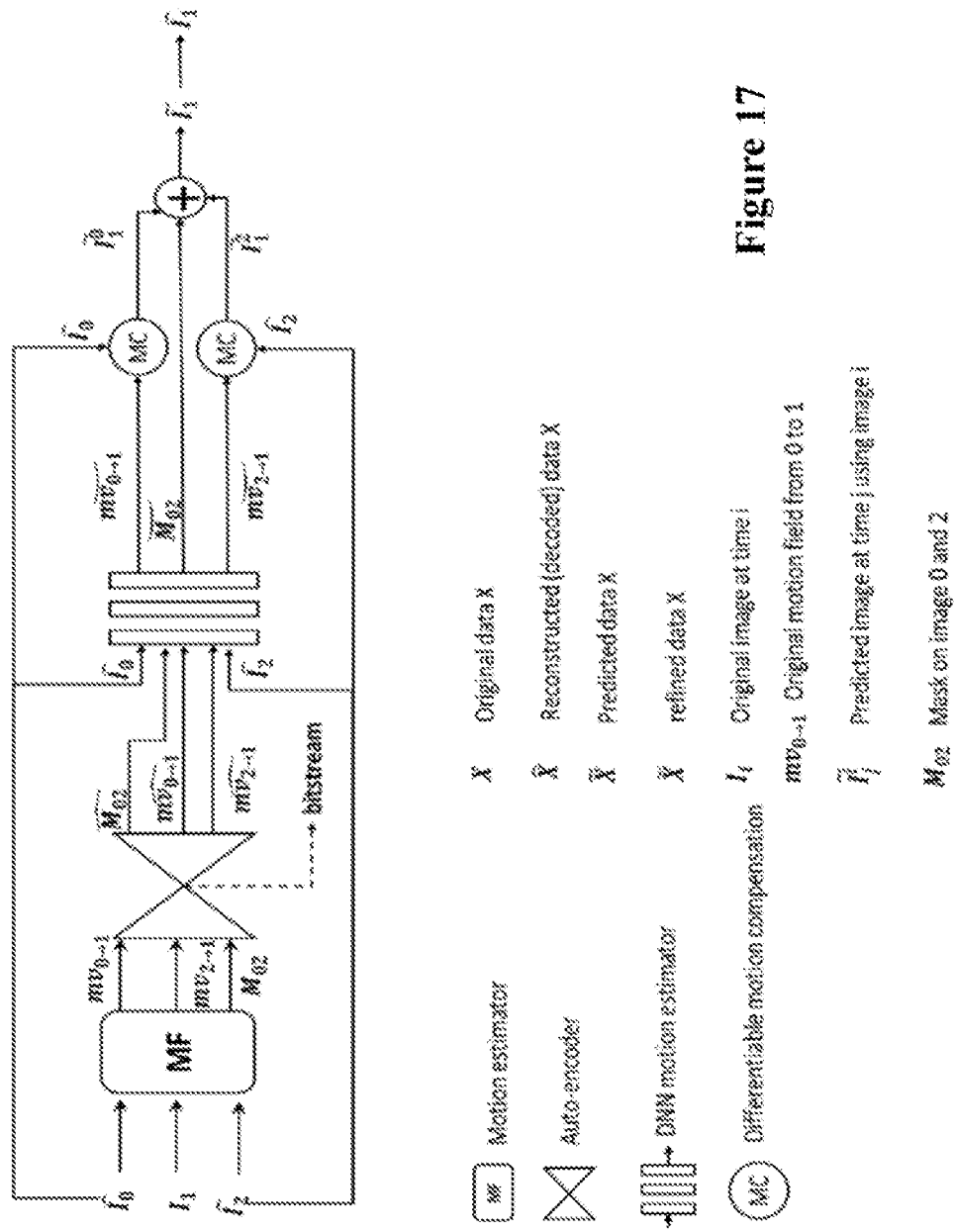
FIG. 17 shows an example of an encoder or an encoding process with advanced prediction and mask refinement according to an embodiment.

FIG. 17 shows a variant of the above process, where not only the motion field but also the mask are refined on the decoder side. Assuming a block-based mask input, the output is the mask refined on a pixel-basis. The associated training is similar to the one described above, as the final loss is not changed (only the prediction computation is modified by the mask information).

In the following, the main process is the same as above, only differences are detailed.

Associated Encoding Process/Encoder

Figure 18:
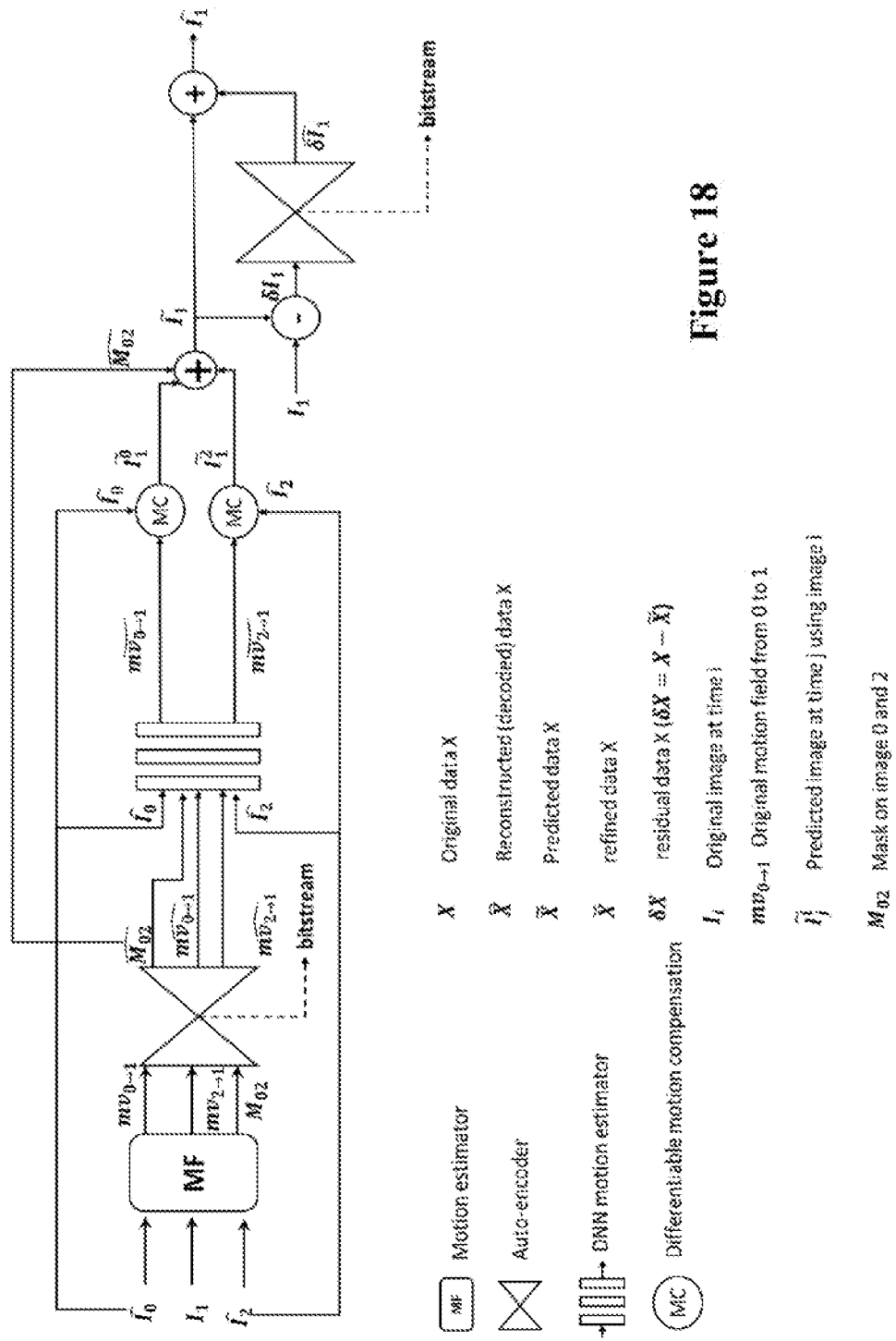
FIG. 18 shows an example of an encoder or an encoding process with advanced prediction and which accounts for residual errors according to an embodiment.

FIG. 18 illustrates a more advanced process in which the whole network also includes a residual error encoding. The residual error $\widetilde{\delta I_1}$ is computed as the difference between the prediction $\hat{I}_1$ and the original image $I_1$. This residual is then auto-encoded and transmitted together in the bitstream with the motion field.

In a variant, the same auto-encoder is used to encode both the motion-field and the residual error together.

Associated Decoding Process/Decoder

Figure 19:
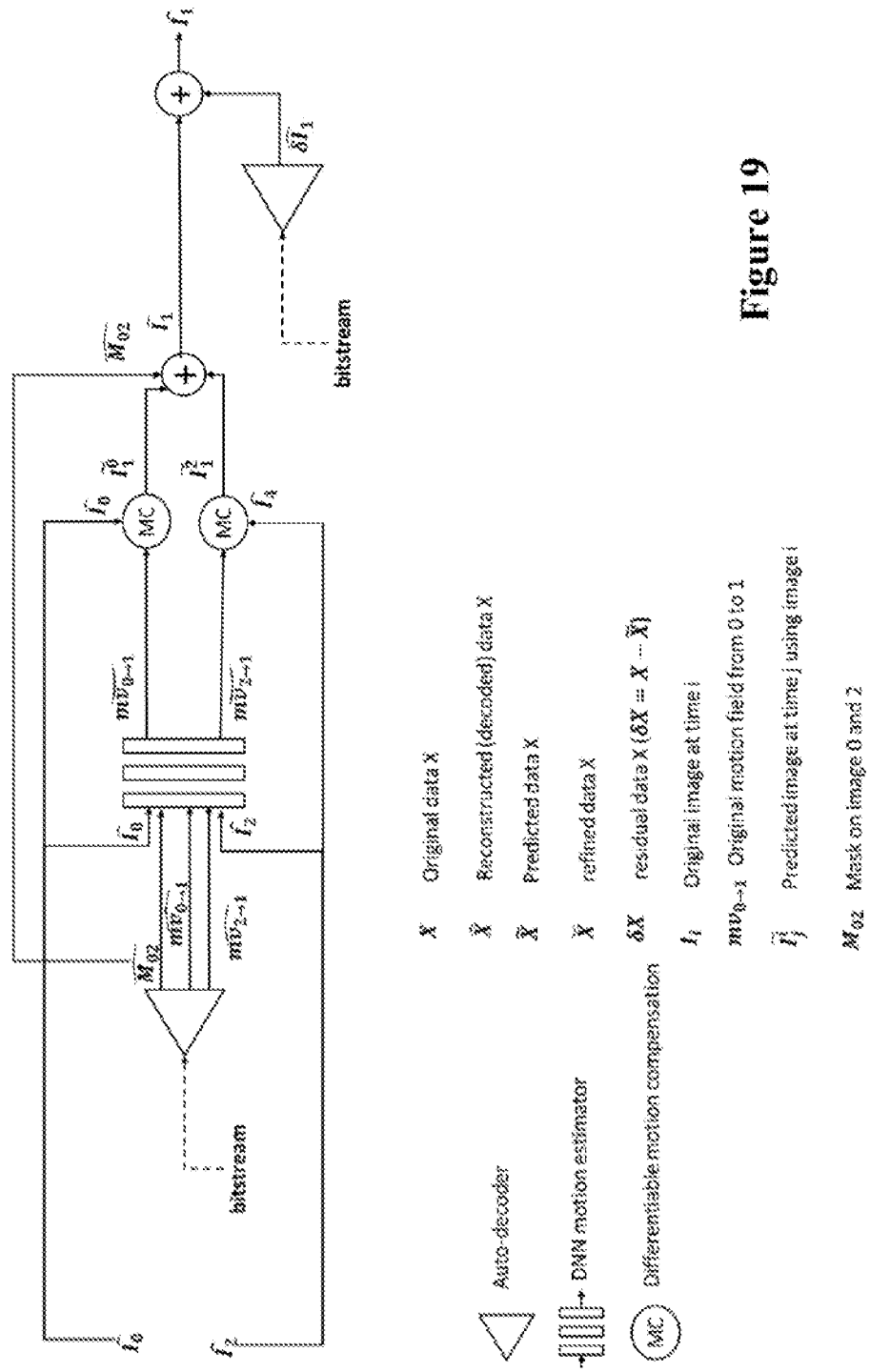
FIG. 19 shows an example of a decoder or a decoding process with advanced prediction which accounts for residual errors according to an embodiment.

FIG. 19 illustrates an exemplary decoding process/decoder for residual based reconstruction. The decoder is similar to the one presented before, except that the decoded error residual is added to the prediction, as shown in FIG. 19.

Figure 20:
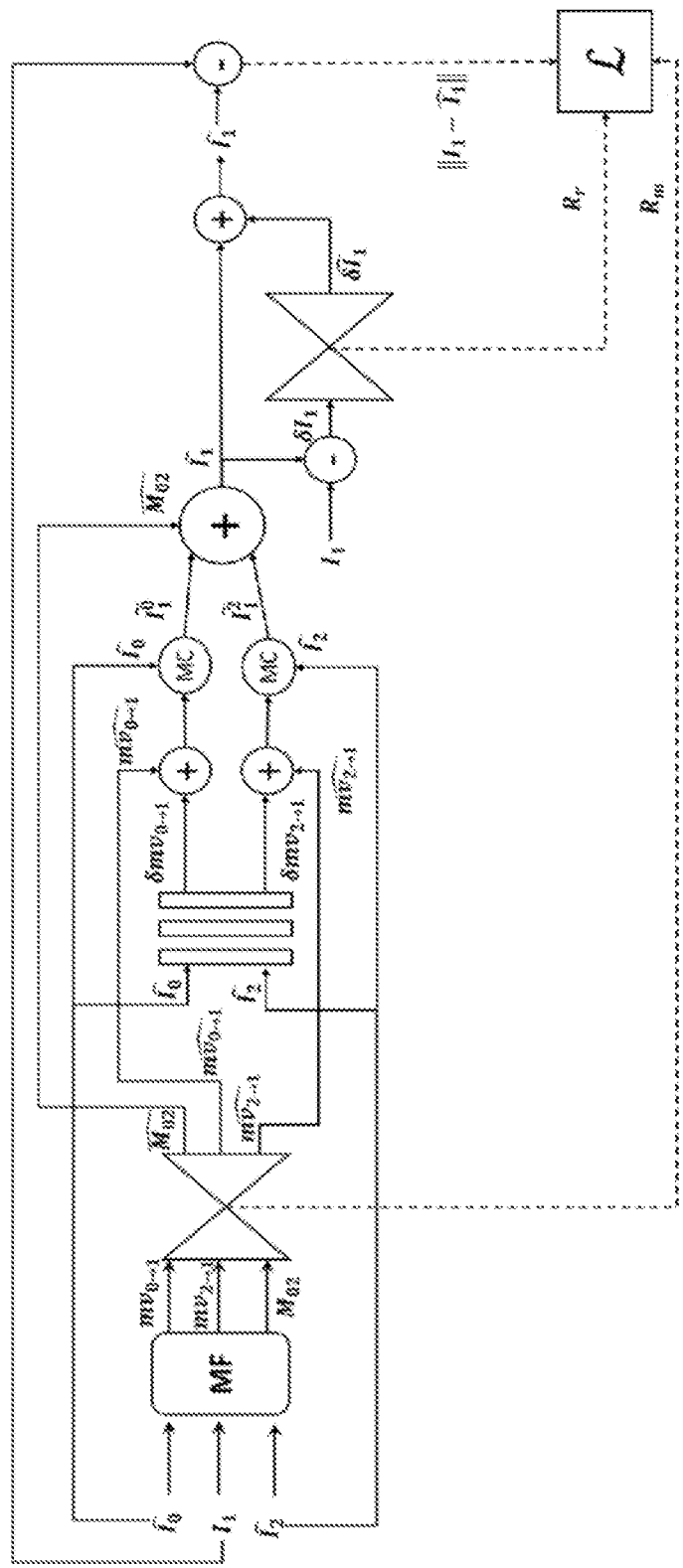
FIG. 20 shows an example of a motion refinement training process which accounts for residual errors according to an embodiment.

FIG. 20 shows an example of a motion refinement training process which accounts for residual errors according to an embodiment. The training process is similar to the one already described except that a new term appears in the loss, related to the coding cost of the residual error. The loss is then expressed as:

$$\mathcal{L} = \|I_1 - \widetilde{I_1}\|_1 + \lambda(R_m + R_r)$$

where $R_m$ is the coding cost of the motion field and $R_r$ the one of the residual error. The quantization steps associated with each network can be either fixed independently of jointly.

Other embodiments are possible for the training process. According to a variant embodiment, each part of the network (auto-encoder and motion field refinement) are trained separately: the motion field auto-encoder is trained using a loss directly on the output motion field error and the coding cost of the motion field; the motion field refinement is trained using a given motion input and pair of images, minimizing the reconstruction loss of the current frame; the residual error auto-encoder is trained using a loss directly on the input image error and the coding cost of the image; all networks are then fine-tuned together.

According to other embodiments, optional regularization terms is are added to the process (weights norms etc.).

As mentioned above, this process is performed by block, where a block has a uniform initial motion field. Alternatively, non-uniform initial motion field is used depending on the motion field refinement DNN type. The output of the network is a pixel-based bi-directional prediction $\widetilde{I_1}$.

Based on the above described processes, additional other variants are possible, e.g., using more than two previously reconstructed frames as input.

Figure 21:
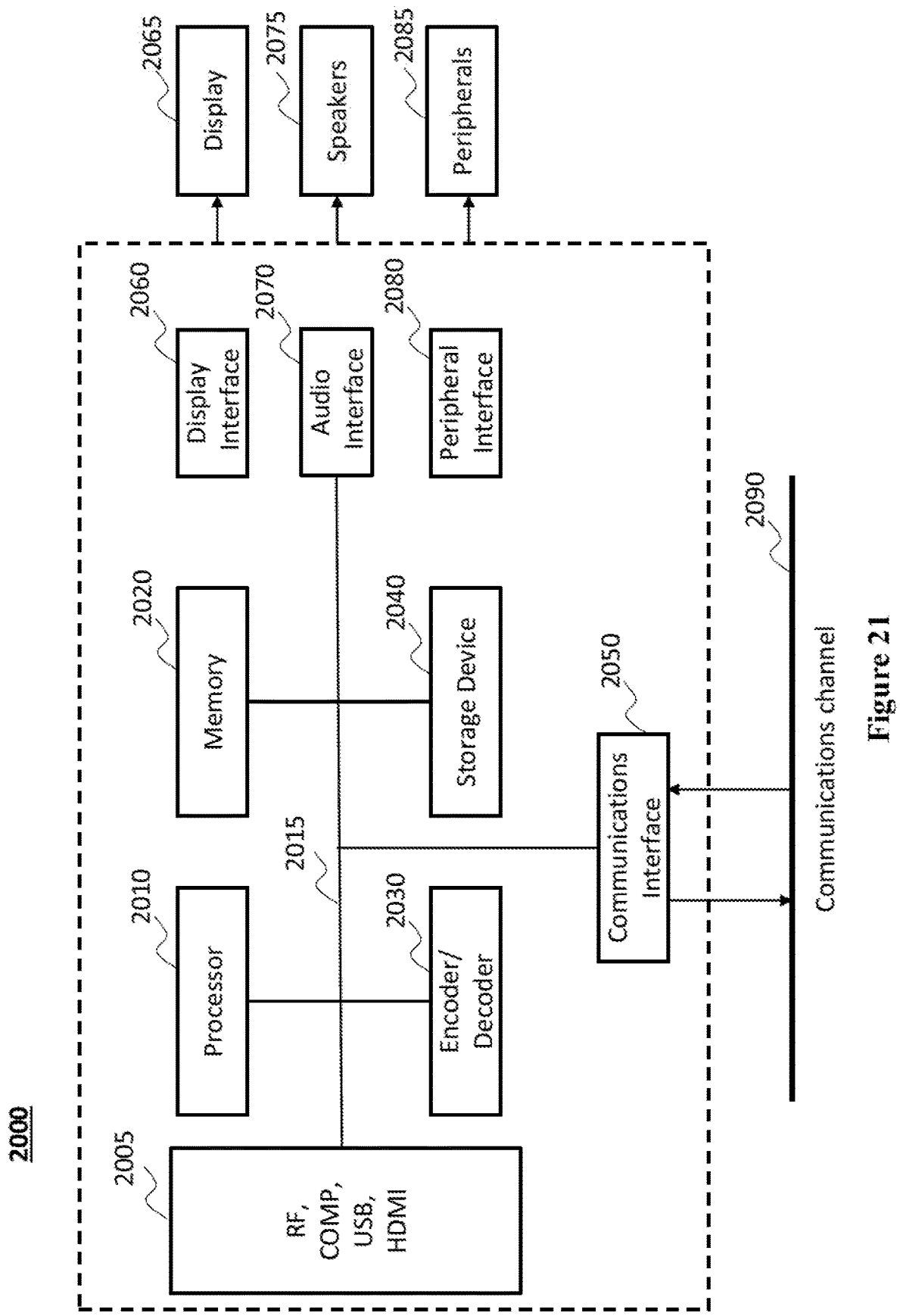
FIG. 21 shows a block diagram of a system in which aspects of the present embodiments may be implemented.

FIG. 21 illustrates a block diagram of an example of a system 2000 in which various aspects and embodiments are implemented. System 2000 can be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes. digital television receivers, personal video recording systems, connected home appliances, and servers. Elements of system 2000, singly or in combination, can be embodied in a single integrated circuit, multiple ICs, and/or discrete components. For example, in at least one embodiment, the processing and encoder/decoder elements of system 2000 are distributed across multiple ICs and/or discrete components. In various embodiments, the system 2000 is communicatively coupled to other similar systems, or to other electronic devices, via, for example, a communications bus or through dedicated input and/or output ports. In various embodiments, the system 2000 is configured to implement one or more of the aspects described in this document.

The system 2000 includes at least one processor 2010 configured to execute instructions loaded therein for implementing, for example, the various aspects described in this document. Processor 2010 can include embedded memory, input output interface, and various other circuitries as known in the art. The system 2000 includes at least one memory 2020 (e.g., a volatile memory device, and/or a non-volatile memory device). System 2000 includes a storage device 2040, which can include non-volatile memory and/or volatile memory, including, but not limited to, EEPROM, ROM, PROM, RAM, DRAM, SRAM, flash, magnetic disk drive, and/or optical disk drive. The storage device 2040 can include an internal storage device, an attached storage device, and/or a network accessible storage device, as non-limiting examples.

System 2000 includes an encoder/decoder module 2030 configured, for example, to process data to provide an encoded video or decoded video, and the encoder/decoder module 2030 can include its own processor and memory. The encoder/decoder module 2030 represents module(s) that can be included in a device to perform the encoding and/or decoding functions. As is known, a device can include one or both of the encoding and decoding modules. Additionally, encoder/decoder module 2030 can be implemented as a separate element of system 2000 or can be incorporated within processor 2010 as a combination of hardware and software as known to those skilled in the art.

Program code to be loaded onto processor 2010 or encoder/decoder 2030 to perform the various aspects described in this document can be stored in storage device 2040 and subsequently loaded onto memory 2020 for execution by processor 2010. In accordance with various embodiments, one or more of processor 2010, memory 2020, storage device 2040, and encoder/decoder module 2030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In several embodiments, memory inside of the processor 2010 and/or the encoder/decoder module 2030 is used to store instructions and to provide working memory for processing that is needed during encoding or decoding. In other embodiments, however, a memory external to the processing device (for example, the processing device can be either the processor 2010 or the encoder/decoder module 2030) is used for one or more of these functions. The external memory can be the memory 2020 and/or the storage device 2040, for example, a dynamic volatile memory and/or a non-volatile flash memory. In several embodiments, an external non-volatile flash memory is used to store the operating system of a television. In at least one embodiment, a fast, external dynamic volatile memory such as a RAM is used as working memory for video coding and decoding operations, such as for MPEG-2, HEVC, or VVC (Versatile Video Coding).

The input to the elements of system 2000 can be provided through various input devices as indicated in block 2005. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 2005 have associated respective input processing elements as known in the art. For example, the RE portion can be associated with elements necessary for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, for example, inserting amplifiers and an analog-to-digital converter. In various embodiments, the RF portion includes an antenna.

Additionally, the USB and/or HDMI terminals can include respective interface processors for connecting system 2000 to other electronic devices across USB and/or HDMI connections. It is to be understood that various aspects of input processing, for example, Reed-Solomon error correction, can be implemented, for example, within a separate input processing IC or within processor 2010 as necessary. Similarly, aspects of USB or HDMI interface processing can be implemented within separate interface ICs or within processor 2010 as necessary. The demodulated, error corrected, and demultiplexed stream is provided to various processing elements, including, for example, processor 2010, and encoder/decoder 2030 operating in combination with the memory and storage elements to process the datastream as necessary for presentation on an output device.

Various elements of system 2000 can be provided within an integrated housing. Within the integrated housing, the various elements can be interconnected and transmit data therebetween using suitable connection arrangement 1140, for example, an internal bus as known in the art, including the I2C bus, wiring, and printed circuit boards.

The system 2000 includes communication interface 2050 that enables communication with other devices via communication channel 2090. The communication interface 2050 can include, but is not limited to, a transceiver configured to transmit and to receive data over communication channel 2090. The communication interface 2050 can include, but is not limited to, a modem or network card and the communication channel 2090 can be implemented. for example, within a wired and/or a wireless medium.

Data is streamed to the system 2000, in various embodiments, using a Wi-Fi network such as IEEE 802.11. The Wi-Fi signal of these embodiments is received over the communications channel 2090 and the communications interface 2050 which are adapted for Wi-Fi communications. The communications channel 2090 of these embodiments is typically connected to an access point or router that provides access to outside networks including the Internet for allowing streaming applications and other over-the-top communications. Other embodiments provide streamed data to the system 2000 using a set-top box that delivers the data over the HDMI connection of the input block 2005. Still other embodiments provide streamed data to the system 2000 using the RF connection of the input block 2005.

The system 2000 can provide an output signal to various output devices, including a display 2065, speakers 2075, and other peripheral devices 2085. The other peripheral devices 2085 include, in various examples of embodiments, one or more of a stand-alone DVR, a disk player, a stereo system, a lighting system, and other devices that provide a function based on the output of the system 2000. In various embodiments, control signals are communicated between the system 2000 and the display 2065, speakers 2075, or other peripheral devices 2085 using signaling such as AV.Link, CEO, or other communications protocols that enable device-to-device control with or without user intervention. The output devices can be communicatively coupled to system 2000 via dedicated connections through respective interfaces 2060, 2070, and 2080. Alternatively, the output devices can be connected to system 2000 using the communications channel 2090 via the communications interface 2050. The display 2065 and speakers 2075 can be integrated in a single unit with the other components of system 2000 in an electronic device, for example, a television. In various embodiments. the display interface 2060 includes a display driver, for example, a timing controller (T Con) chip.

The display 2065 and speaker 2075 can alternatively be separate from one or more of the other components, for example, if the RF portion of input 2005 is part of a separate set-top box. In various embodiments in which the display 2065 and speakers 2075 are external components, the output signal can be provided via dedicated output connections, including, for example, HDMI ports, USB ports, or COMP outputs.

The embodiments can be carried out by computer software implemented by the processor 2010 or by hardware, or by a combination of hardware and software. As a non-limiting example, the embodiments can be implemented by one or more integrated circuits. The memory 2020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 2010 can be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments refer to rate distortion optimization. In particular, during the encoding process, the balance or trade-off between the rate and distortion is usually considered, often given the constraints of computational complexity. The rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this document are not necessarily all referring to the same embodiment.

Additionally, this document may refer to "determining" various pieces of information. Determining the information can include one or more of, for example, estimating the information, calculating the information, predicting the information, or retrieving the information from memory.

Further, this document may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this document may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a plurality of parameters. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

We describe a number of embodiments. Features of these embodiments can be provided alone or in any combination. Further, embodiments can include one or more of the above exemplary features, devices, or aspects, alone or in any combination, across various claim categories and types.

Various other generalized, as well as particularized, aspects, embodiments and claims are also supported and contemplated throughout this disclosure. For example, various methods and other aspects described in this application can be used to modify modules, for example, motion compensation and estimation modules (170, 175; and 275), of a video encoder 100 and decoder 200 as shown respectively in FIG. 1 and FIG. 2. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

The invention claimed is:

1. A method for video encoding, comprising:
providing a region to encode and one or more reconstructed regions to a motion estimator to produce an output comprising an estimated bi-predicted motion field for the region to encode, the estimated bi-predicted motion field comprising two uni-directional motion fields;
providing the estimated bi-predicted motion field to an auto-encoder to produce an output comprising video data representative of the encoded region and reconstructed bi-predicted motion field;
providing the reconstructed bi-predicted motion field and one or more reconstructed regions to a deep neural network to produce an output comprising refined bi-predicted motion field for the region to encode by determining a motion correction that is applied to at least one of the two uni-directional motion fields of the reconstructed bi-predicted motion field to produce the refined bi-predicted motion field; and
providing the refined bi-predicted motion field and one or more reconstructed regions to a motion compensator to produce an output comprising reconstructed version of the region to encode.

2. A method for video decoding, comprising:
providing video data representative of an encoded region to an auto-decoder to produce an output comprising a reconstructed bi-predicted motion field, the reconstructed bi-predicted motion field comprising two uni-directional motion fields;
providing the reconstructed bi-predicted motion field and one or more reconstructed regions to a deep neural network to produce an output comprising a refined reconstructed bi-predicted motion field by determining a motion correction that is applied to at least one of the two uni-directional motion fields of the reconstructed bi-predicted motion field to produce the refined bi-predicted motion field; and
providing the refined bi-predicted motion field and one or more reconstructed regions to a motion compensator to produce an output comprising reconstructed version of the encoded region, the output corresponding to the decoded region.

3. The method of claim 2, wherein the motion compensator performs a differentiable motion compensation based on the refined bi-predicted motion field and the one or more reconstructed regions.

4. The method of claim 2, wherein the motion correction is applied symmetrically to the two uni-directional motion fields of the reconstructed bi-predicted motion field to produce the refined bi-predicted motion field.

5. The method of claim 2, wherein the motion correction is one of two different motion corrections that are respectively applied to each of the two uni-directional motion fields of the reconstructed bi-predicted motion field to produce the refined bi-predicted motion field.

6. The method of claim 2, wherein the refined bi-predicted motion field is based respectively on 1) a uni-directional motion field between a region of a first reference frame and the region to decode of a subsequent frame, and 2) a uni-directional motion field between the region to decode in the subsequent frame and a region of a next subsequent frame.

7. The method of claim 2, wherein the one or more reconstructed regions belongs to a plurality of frames forming a Group of Picture in a video sequence.

8. The method of claim 2, wherein the providing the one or more reconstructed regions to a deep neural network is performed by enlarging the one or more reconstructed regions at an input of the deep neural network.

9. The method of claim 2, wherein a training process is provided for the deep neural network using at least a pair of reconstructed regions.

10. The method of claim 2, wherein a region is one of a block or a frame.

11. The method of claim 2, wherein a mask for weighting motion-compensated prediction regions is further provided to the auto-decoder.

12. The method of claim 11, wherein the mask for weighting motion-compensated prediction regions is further refined.

13. A non-transitory computer readable medium containing data content generated according to:
providing a region to encode and one or more reconstructed regions to a motion estimator to produce an output comprising an estimated bi-predicted motion field for the region to encode, the estimated bi-predicted motion field comprising two uni-directional motion fields;
providing the estimated bi-predicted motion field to an auto-encoder to produce an output comprising data content representative of the encoded region and reconstructed bi-predicted motion field;
providing the reconstructed bi-predicted motion field and one or more reconstructed regions to a deep neural network to produce an output comprising refined bi-predicted motion field for the region to encode by determining a motion correction that is applied to at least one of the two uni-directional motion fields of the reconstructed bi-predicted motion field to produce the refined bi-predicted motion field; and
providing the refined bi-predicted motion field and one or more reconstructed regions to a motion compensator to produce an output comprising reconstructed version of the region to encode.

14. A non-transitory computer readable medium having stored thereon program code instructions for performing the method according to claim 2, when the program is executed by a processor.

15. A device for video encoding, comprising:
a motion estimator receiving a region to encode and one or more reconstructed regions and producing an output comprising an estimated bi-predicted motion field for the region to encode, the estimated bi-predicted motion field comprising two uni-directional motion fields;
an auto-encoder receiving the estimated bi-predicted motion field and producing an output comprising video data representative of the encoded region and reconstructed bi-predicted motion field;
a deep neural network receiving the reconstructed bi-predicted motion field and one or more reconstructed regions and producing an output comprising refined bi-predicted motion field for the region to encode wherein the deep neural network determines a motion correction that is applied to at least one of the two uni-directional motion fields of the reconstructed bi-predicted motion field to produce the refined bi-predicted motion field; and
a motion compensator receiving the refined bi-predicted motion field and one or more reconstructed regions and producing an output comprising reconstructed version of the region to encode.

16. A device for video decoding, comprising:
an auto-decoder receiving video data representative of an encoded region and producing an output comprising a reconstructed bi-predicted motion field, the reconstructed bi-predicted motion field comprising two uni-directional motion fields;
a deep neural network receiving the reconstructed bi-predicted motion field and one or more reconstructed regions and producing an output comprising refined bi-predicted motion field, wherein the deep neural network determines a motion correction that is applied to at least one of the two uni-directional motion fields of the reconstructed bi-predicted motion field to produce the refined bi-predicted motion field; and
a motion compensator receiving the refined bi-predicted motion field and one or more reconstructed regions and producing an output comprising reconstructed version of the encoded region.

17. The device of claim 16, wherein the motion compensator performs a differentiable motion compensation based on the refined bi-predicted motion field and the one or more reconstructed regions.

18. The device of claim 16, wherein the auto-decoder performs receiving a mask for weighting motion-compensated prediction regions.

19. The method of claim 1, wherein the motion compensator performs a differentiable motion compensation based on the refined bi-predicted motion field and the one or more reconstructed regions.

20. The method of claim 1, wherein the motion correction is applied symmetrically to the two uni-directional motion fields of the reconstructed bi-predicted motion field to produce the refined bi-predicted motion field.

21. The method of claim 1, wherein the motion correction is one of two different motion corrections that are respectively applied to each of the two uni-directional motion fields of the reconstructed bi-predicted motion field to produce the refined bi-predicted motion field.

22. The method of claim 1, wherein a mask for weighting motion-compensated prediction regions is further provided to the auto-encoder.

23. The device of claim 15, wherein the motion compensator performs a differentiable motion compensation based on the refined bi-predicted motion field and the one or more reconstructed regions.

24. The device of claim 15, wherein the motion correction is applied symmetrically to the two uni- directional motion fields of the reconstructed bi-predicted motion field to produce the refined bi-predicted motion field.

25. The device of claim 15, wherein the motion correction is one of two different motion corrections that are respectively applied to each of the two uni-directional motion fields of the reconstructed bi- predicted motion field to produce the refined bi-predicted motion field.

26. The device of claim 15, wherein a mask for weighting motion-compensated prediction regions is further provided to the auto-encoder.

27. The device of claim 16, wherein the motion correction is applied symmetrically to the two uni- directional motion fields of the reconstructed bi-predicted motion field to produce the refined bi-predicted motion field.

28. The device of claim 16, wherein the motion correction is one of two different motion corrections that are respectively applied to each of the two uni-directional motion fields of the reconstructed bi- predicted motion field to produce the refined bi-predicted motion field.

* * * * *